United States Patent
Shimada et al.

(10) Patent No.: US 8,665,344 B2
(45) Date of Patent: Mar. 4, 2014

(54) DEVICE AND METHOD FOR IMAGE PROCESSING

(75) Inventors: Junji Shimada, Tokyo (JP); Akihisa Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 156 days.

(21) Appl. No.: 13/159,731

(22) Filed: Jun. 14, 2011

(65) Prior Publication Data

US 2012/0019680 A1 Jan. 26, 2012

(30) Foreign Application Priority Data

Jul. 20, 2010 (JP) ................................ 2010-162547

(51) Int. Cl.
*H04N 5/235* (2006.01)
*H04N 5/228* (2006.01)

(52) U.S. Cl.
USPC .................... 348/229.1; 348/362; 348/208.12

(58) Field of Classification Search
USPC ...................... 348/208.99, 229.1, 362, 208.12
See application file for complete search history.

(56) References Cited

U.S. PATENT DOCUMENTS

| | | | | |
|---|---|---|---|---|
| 4,769,710 A | * | 9/1988 | Uchida | 348/294 |
| 5,555,021 A | * | 9/1996 | Igarashi | 348/222.1 |
| 6,414,649 B2 | * | 7/2002 | Tonosaki et al. | 345/1.1 |
| 8,045,035 B2 | * | 10/2011 | Shiraishi | 348/312 |
| 2004/0150730 A1 | * | 8/2004 | Satake et al. | 348/245 |
| 2005/0012826 A1 | * | 1/2005 | Hattori et al. | 348/220.1 |
| 2006/0077267 A1 | * | 4/2006 | Kido | 348/241 |
| 2007/0035650 A1 | * | 2/2007 | Suzuki | 348/312 |
| 2007/0109412 A1 | * | 5/2007 | Hara | 348/207.1 |
| 2008/0055421 A1 | * | 3/2008 | Kimura | 348/208.99 |
| 2009/0167878 A1 | * | 7/2009 | Kawazoe et al. | 348/208.5 |
| 2010/0157077 A1 | * | 6/2010 | Shiraishi | 348/222.1 |

FOREIGN PATENT DOCUMENTS

| | | |
|---|---|---|
| JP | 2005-278135 | 10/2005 |
| JP | 2008-118378 | 5/2008 |

* cited by examiner

*Primary Examiner* — Aung S Moe
*Assistant Examiner* — Amy Hsu
(74) *Attorney, Agent, or Firm* — Pramod Chintalapoodi

(57) ABSTRACT

An imaging device includes an image capturing element which photoelectrically converts a subject image into electrical charge information, a driving device which drives a driving part related to image capturing, and a controlling unit which changes a driving frequency of the driving device at a timing to read the electrical charge information from the image capturing element.

21 Claims, 14 Drawing Sheets

DEVICE AND METHOD FOR IMAGE PROCESSING

BACKGROUND

The present disclosure relates to an imaging device, a controlling device and a controlling method.

In the past, for example, Japanese Patent Application Laid-Open No. 2008-118378 discloses a technique to stop driving an image capturing lens in a period for reading an image signal of pixels of image columns to prevent the image signal from containing noise due to driving of the image capturing lens.

Further, Japanese Patent Application Laid-Open No. 2005-278135 and W. Yang et al. ("An Integrated 800×600 CMOS Image System", ISSCC Digest of Technical Papers, pp. 304-305, February, 1999) disclose a column parallel ADC-mounted CMOS image sensor.

SUMMARY

However, if an image capturing lens is not driven in a period for reading an image signal, the time is spent until control is restored, and there is an issue that capturing a next image is restricted. Further, when a movie is shot, the movie is continuously shot in a period for reading image signals, and therefore it is difficult to stop driving the image capturing lens.

In light of the foregoing, it is desirable to provide a novel and improved imaging device, controlling device and imaging device controlling method which can reliably suppress the noise influence due to driving of a driving device.

According to an embodiment of the present invention, there is provided an imaging device includes an image capturing element which photoelectrically converts a subject image into electrical charge information, a driving device which drives a driving part related to image capturing, and a controlling unit which changes a driving frequency of the driving device at a timing to read the electrical charge information from the image capturing element.

In this configuration, when a mode related to the image capturing is changed, the controlling unit changes the driving frequency of the driving device to a frequency matching the mode.

In this configuration, when the driving frequency of the driving device is changed, the controlling unit changes servo characteristic parameters of the driving device together with the driving frequency.

In this configuration, the controlling unit changes the driving frequency of the driving device according to gain characteristics of a CDS circuit of the image capturing element.

In this configuration, the controlling unit acquires a timing to read the electrical charge information from the image capturing element based on a driving signal for opening and closing a mechanical shutter of an image capturing optical system.

In this configuration, the driving part is a correcting lens for image stabilization.

According to another embodiment of the present invention, there is provided a controlling device includes a timing acquiring unit which acquires a timing to read electrical charge information from an image capturing element which photoelectrically converts a subject image into the electrical charge information, and a driving controlling unit which changes a driving frequency of a driving device which drives a driving part related to image capturing, at a timing to read the electrical charge information from the image capturing element.

In this configuration, when a mode related to the image capturing is changed, the driving controlling unit changes the driving frequency of the driving device to a frequency matching the mode.

In this configuration, the driving controlling unit changes servo characteristic parameters of the driving device together with the driving frequency.

In this configuration, the driving controlling unit changes the driving frequency of the driving device according to gain characteristics of a CDS circuit of the image capturing element.

According to another embodiment of the present invention, there is provided an imaging device controlling method includes acquiring a timing to read electrical charge information from an image capturing element which photoelectrically converts a subject image into the electrical charge information, and changing a driving frequency of a driving device which drives a driving part related to image capturing, at a timing to read the electrical charge information from the image capturing element.

In this configuration, the imaging device controlling method according to claim 11, further includes when a mode related to the image capturing is changed, changing the driving frequency of the driving device to a frequency matching the mode.

In this configuration, in the step of changing the driving frequency, servo characteristic parameters of the driving device are changed together with the driving frequency.

In this configuration, in the step of changing the driving frequency, the driving frequency of the driving device is changed according to gain characteristics of a CDS circuit of the image capturing element.

According to the present disclosure, there are provided an imaging device, a controlling device and an imaging device controlling method which can reliably suppress the noise influence due to driving of a driving device.

DETAILED DESCRIPTION OF THE EMBODIMENTS

Figure 1:
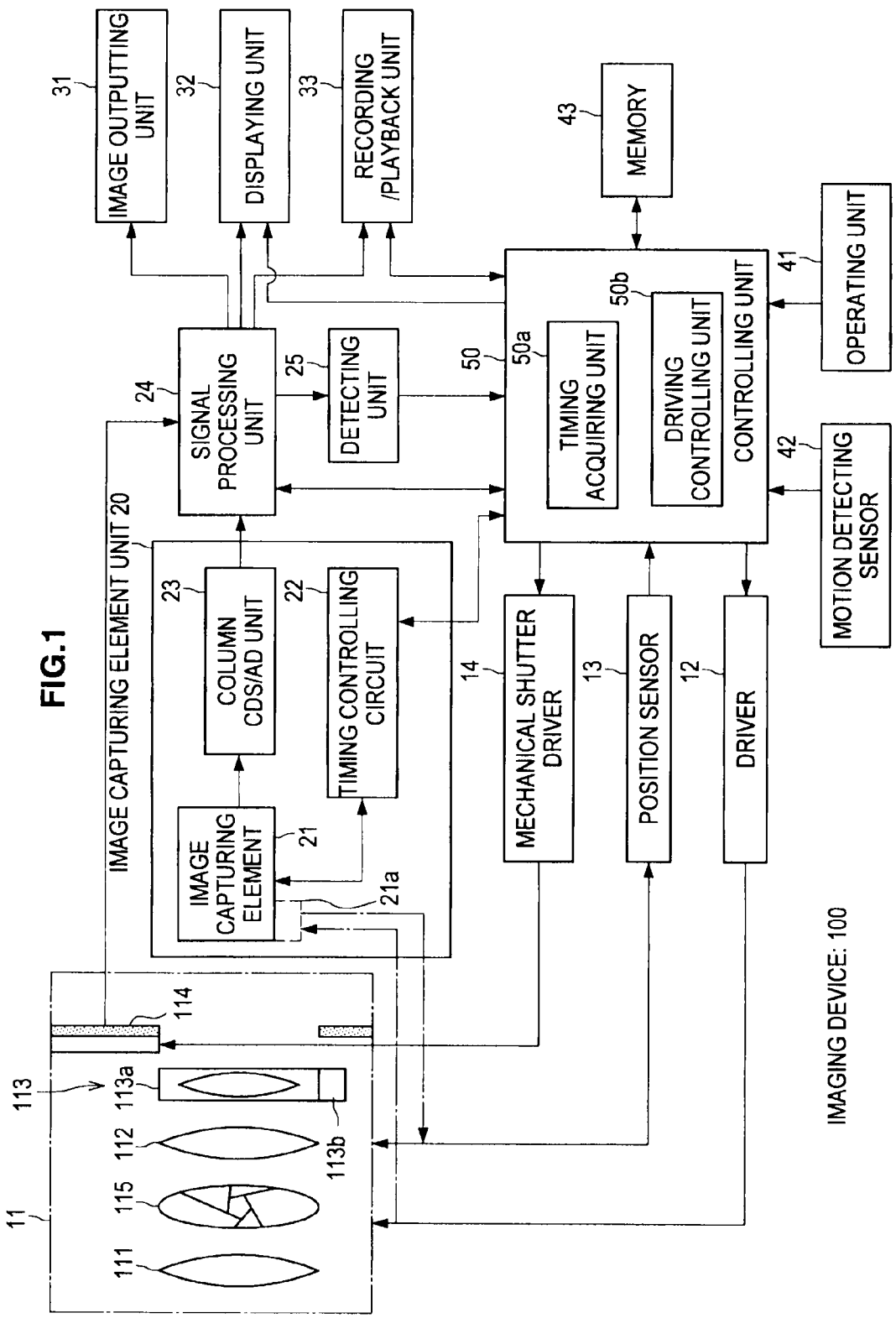
FIG. 1 is a block diagram showing a configuration of an imaging device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and the repeated explanation of these structural elements is omitted.

In addition, explanation will be provided in the following order.
1. Configuration example of imaging device
2. Column parallel ADC-mounted solid state image capturing element
3. Occurrence of magnetic fog
4. Method of avoiding magnetic fog phenomenon in static image capturing mode
   4-1. First method of avoiding magnetic fog phenomenon
   4-2. Second method of avoiding magnetic fog phenomenon
5. Method of avoiding magnetic fog phenomenon in movie shooting mode

[1. Configuration Example of Imaging Device]

FIG. 1 is a block diagram showing a configuration of an imaging device 100 according to an embodiment of the present disclosure. The imaging device 100 is, for example, a device such as a digital still camera or digital video camera. The imaging device 100 has an image capturing optical system block 11, a driver 12, an image capturing optical system sensor (position sensor) 13, an image capturing element 21, a timing controlling circuit 22, a Column CDS/AD circuit unit 23, an AFE unit 23, a signal processing unit 24 and a detecting unit 25. Further, the imaging device 100 has an image outputting unit 31, a displaying unit 32, a recording/playback unit 33, an operating unit 41, a motion detecting unit 42, a memory 43 and a controlling unit 50.

The image capturing optical system block 11 has a lens unit. The lens unit has, for example, a zoom lens 111 which varies the magnification, a focus lens 112 which performs focusing and a correcting lens unit 113 which moves, on the image capturing surface, the position of an optical image formed on the image capturing surface of the image capturing element 21 which will be explained below. Further, the image capturing optical system block 11 has a mechanical shutter 114 which mechanically adjusts the exposure amount of the image capturing element 21 with respect to the image capturing surface, and an aperture mechanism 115 which adjusts the light amount of an optical image formed on the image capturing surface of the image capturing element 21.

The correcting lens unit 113 has, for example, a correcting lens 113a which is provided such that the optical axis matches with the optical axis of the image capturing optical system, and an actuator 113b which displaces this correcting lens in a direction orthogonal to the optical axis of the image capturing optical system. The correcting lens unit 113 employing this configuration causes the actuator 113b to move the correcting lens 113a in the direction orthogonal to the optical axis of the image capturing optical system, and displaces a relative positional relationship between the lenses 111 and 112 and image capturing element 21 with respect to the optical axis.

Further, the correcting lens unit 113 may employ a configuration including an apex angle variable prism unit. The apex angle variable prism unit is formed by providing a translucent incidence end plate and emission end plate in end surfaces of a bendable tube such as bellows, and sealing translucent liquid with a desired reflectivity in the tube. When an apex angle variable prism unit is used, an optical wedge is formed by fixing one of the incidence end plate and emission end plate and driving the other one by the actuator 113b. The correcting lens unit 113 employing this configuration, for example, displaces an inclination angle of the emission end plate with respect to the incident end plate to move, on the image capturing surface, the position of the optical image formed on the image capturing surface.

The actuator 113b which drives the correcting lens 113a or apex angle variable prism unit mainly has a magnet and coil. The actuator 113b drives an apex angle variable prism 21a or correcting lens 113 by applying the current to the coil and producing electromagnetic force with respect to the coil by means of the magnetic field produced from the coil.

The driver 12 drives the zoom lens 111, focus lens 112 and actuator 113b of the correcting lens unit 113 based on a lens control signal from the controlling unit 50 which will be explained below. Further, the driver 12 drives the aperture mechanism 115 based on an aperture control signal from the controlling unit 50.

As the driving scheme for driving the zoom lens 111, focus lens 112 and correcting lens unit 113, the PWM (Pulse Width Modulation) scheme is used, for example. Control according to the PWM scheme is a pulse controlling method of making the amplitude of the driving voltage constant and changing the duration of pulses which change in a rectangular wave in a predetermined period.

In addition, although a case will be explained with the present embodiment as an example where both of the focus lens 112 and correcting lens unit 113 are subjected to PWM driving, the driving scheme is by no means limited to this. Although handling of the noise source which produces the magnetism of, for example, the coil will be mainly explained with the present embodiment, it is possible to avoid noise having the periodicity produced by, for example, a power source DD converter or liquid crystal panel in addition to the coil according to the same method. In addition, PWM driving is susceptible to the noise influence because, in case of PWM driving, the change of the magnetic flux in the rising or falling operation of the voltage is maximized and, as a result, the starting voltage fluctuation due to electromagnetic induction becomes great. Further, in the present description, the noise influence due to the production of the magnetism will be referred to as "magnetic fog".

The image capturing optical system sensor 13 detects lens positions of the zoom lens 111 and focus lens 112, the displaced state of the correcting lens 113 (displaced position and corrected angle of the correcting lens 113a) and the setting position of the aperture mechanism 115 to supply a position signal to the controlling unit 50.

A mechanical shutter driver 14 drives the mechanical shutter 114 to open and close based on a shutter open/close signal sent from the controlling unit 50 to provide an adequate exposure amount upon exposure when a still image is captured.

As the image capturing element 21, for example, an image capturing element such as a CCD (Charge Coupled Devices) image sensor, or a CMOS (Complementary Metal Oxide Semiconductor) image sensor can be used. A case will be explained with the present embodiment as an example where the CMOS image sensor is used as the image capturing element 21. The image capturing element 21 converts the optical image formed by the image capturing optical system block 11 on the imaging surface of the image capturing optical system block 11 into an electrical signal to output the signal to the CDS/AD circuit unit 23. The timing controlling circuit 22 generates various driving pulses to output electrical signals matching image data captured in the image capturing element 21. Further, the timing controlling circuit 22 generates, for example, an electronic shutter pulse for controlling an electrical charge accumulation time of the image capturing element 21.

The CDS/AD circuit unit 23 performs noise cancellation processing such as CDS (Correlated Double Sampling) processing with respect to an electrical signal (image signal) output from the image capturing element 21. Further, the CDS/AD circuit unit 23 performs gain control processing (AGC (Automatic Gain Control)) of adjusting the image capturing signal to a desired signal level. Furthermore, the CDS/AD circuit unit 23 converts an analog image capturing signal to which noise cancellation processing and gain control are applied, into a digital signal, and outputs the digital signal to the signal processing unit 24 through the AFE unit 23.

The signal processing unit 24 performs, for example, camera signal pre-processing, camera signal processing, resolution conversion processing and compression/extension processing. In the camera signal pre-processing, the signal processing unit 24 performs defect correction processing of correcting a signal of a defective pixel in the image capturing element 21 and shading correction processing of correcting the decrease in the light amount in the surrounding of the lenses with respect to an image signal supplied from the CDS/AD circuit unit 23. Further, the signal processing unit 24 adjusts the white balance and corrects the brightness in the camera signal processing. Further, for example, with a digital camera, there are cases where one image capturing element 21 is configured to provide each signal of red, green, and blue by providing a color filter array in front of the image capturing element 21. In this case, the signal processing unit 24 performs demosaic processing in the camera signal processing to generate a signal of color which is defective in each pixel by, for example, interpolation using signals of pixels in the surrounding.

Further, in the resolution conversion processing, the signal processing unit 24 converts the image signal to which the camera signal processing is applied or an image signal which is expanded and decoded, into predetermined resolution. In compression/expansion processing, the signal processing unit 24 compresses and encodes the image signal to which the camera signal processing is applied or the image signal to which the resolution conversion processing is applied, and generates, for example, an encoded signal of the JPEG scheme. Further, in the compression/expansion processing, the signal processing unit 24 expands and decodes the encoded signal of the JPEG scheme. In addition, in the compression/expansion processing, a still image signal may be compressed and encoded according to a scheme different from the JPEG scheme. Further, in the compression/expansion processing, a movie image signal may be compressed and encoded according to the movie compression scheme.

The controlling unit 50 controls each component of the imaging device 100. According to the present embodiment, the controlling unit 50 acquires a timing to read electrical charge information from the image capturing element 21, and performs control of changing the driving frequency of the actuator 113*b* of the correcting lens unit 113 or performs control of stopping the actuator 113*b* at this timing. Hence, the controlling unit 50 has a timing acquiring unit 50*a* which acquires the timing to read electrical charge information from the image capturing element 21, and a driving controlling unit 50*b* which changes the driving frequency of a driving device at the timing to read the electrical charge information from the image capturing element 21. Further, as explained below, when mode related to image capturing is changed, the driving controlling unit 50*b* performs control of changing the driving frequency of the driving device to the frequency matching a mode. Further, the driving controlling unit 50*b* performs control of changing servo characteristics of the driving device together with the driving frequency. Further, the driving controlling unit 50*b* changes the driving frequency of the driving device according to gain characteristics of the CDS circuit of the image capturing element 21.

The image outputting unit 31 outputs image data sent from the signal processing unit 24, to the outside. The display unit 32 is a display which displays image data sent from the signal processing unit 24. Further, the recording/playback unit 33 records image data, and performs processing of playing back the recorded image data.

The operating unit 41 includes various operating units such as a shutter button. Further, a mode switch button for static image mode and movie mode is also included in the operating unit 41. The motion detecting sensor 42 is a sensor which detects the motion of the imaging device 100 such as hand jiggling. The controlling unit 50 sends a control signal for driving the actuator 113*b* of the correcting lens unit 113, to the driver 12 based on the motion detected by the motion detecting sensor 42. The driver 12 drives the actuator 113*b* based on this control signal and moves the correcting lens 113*a* in the direction orthogonal to the optical axis of the image capturing optical system to correct blurring of an image due to hand jiggling.

[2. Column Parallel ADC-Mounted Solid State Image Capturing Element]

By the way, recently, a CMOS image sensor has been attracting attention as a solid state image capturing element (image sensor) in place of a CCD image sensor. The CCD image sensor needs dedicated process to manufacture CCD pixels, needs a plurality of power source voltages for this operation, and needs to be operated by combining a plurality of peripheral ICs, and therefore the system becomes complicated. The reason why the CMOS image sensor has been attracting attention is because the CMOS image sensor overcomes these issues.

As its manufacturing process, the CMOS image sensor can use the same manufacturing process as a general CMOS integrated circuit, and can be driven by a single power source. Further, analog circuits and logical circuits using CMOS process can be mixed in a single chip, and therefore it is possible to reduce the number of peripheral ICs. Thus, the CMOS image sensor has multiple substantial advantages.

With the output circuit of the CCD image sensor, 1 channel (ch) output using an FD amplifier including a floating diffusion (FD) layer is the main stream. By contrast with this, the CMOS image sensor has the FD amplifier in each pixel and, as its output, a column parallel output which selects one row in the pixel array and reads the rows in the column direction at the same time is the main stream. This is because the FD amplifier arranged in each pixel hardly provides sufficient driving performance and the data rate is decreased, and therefore parallel processing is effective. Various signal outputting circuits of this column parallel output CMOS image sensor are proposed.

As a method used to read a pixel signal of the CMOS image sensor, there is a method of temporarily sampling a signal electrical charge which is an optical signal generated in the photoelectric converting element such as a photodiode, in the capacitor through the MOS switch arranged near the photoelectrical converting element and reading the sampled capacitor.

In the sampling circuit, noise which is inversely correlated with a sampling capacitor value is generally included. In the pixel circuit, when a signal electrical charge is transferred to the capacitor to sample, a potential gradient is utilized and the signal electrical charge is completely transferred, and therefore noise is not produced in this sampling process. However, noise is contained when the voltage level of the capacitor before the sampling process is reset to a reference value.

A general method of canceling this noise includes correlated double sampling (CDS). With this method, the signal electrical charge is once read and stored in a state (reset level) immediately before sampling, and the signal level after sampling is read and noise is cancelled by subtracting this signal level from the reset level. There are various methods for specific methods of CDS.

Figure 2:
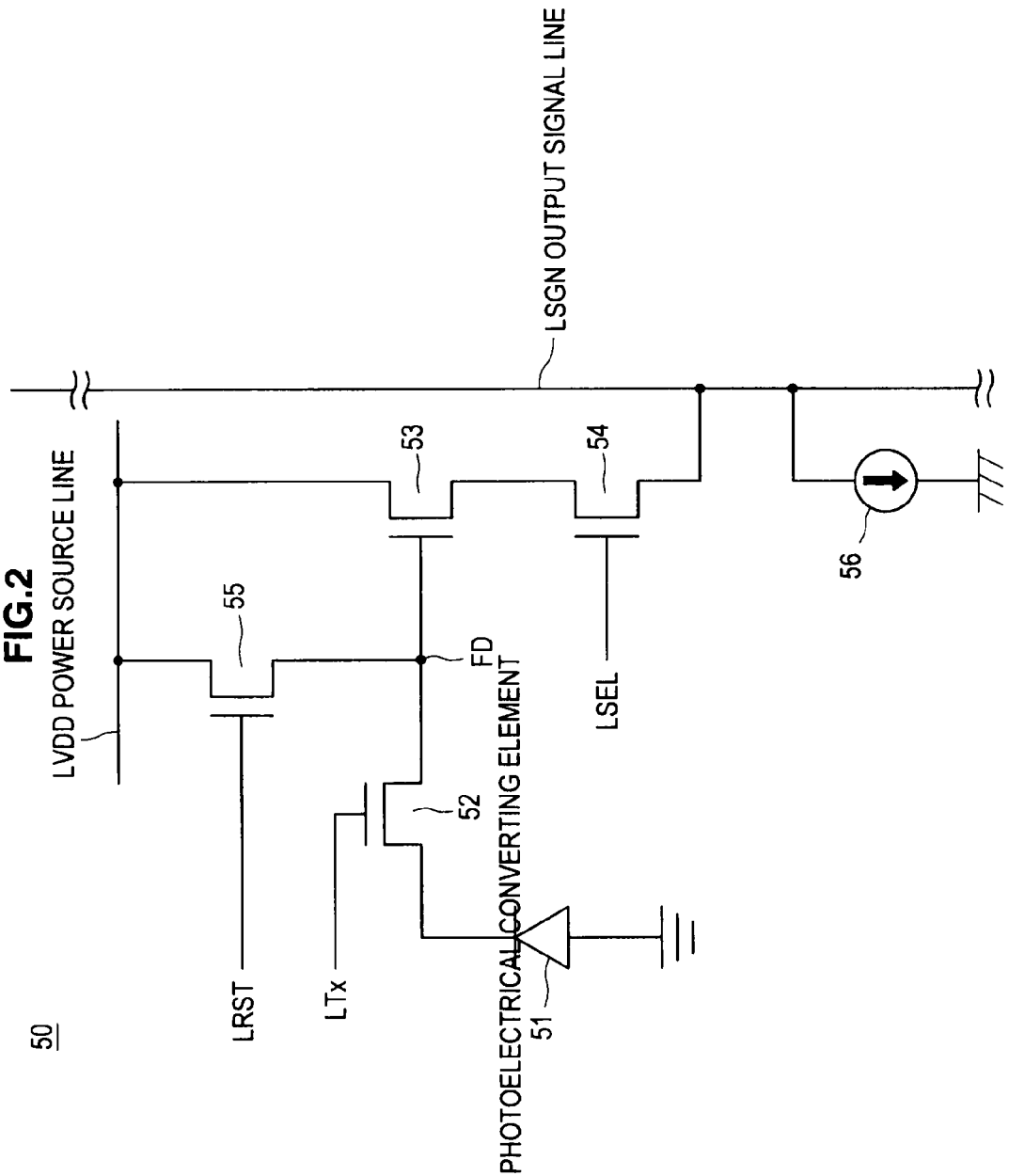
FIG. 2 is a view showing an example of a pixel circuit of a CMOS image sensor including four transistors.

A general CMOS image sensor will be explained below, and a specific method of CDS will be explained. FIG. 2 is a view showing an example of a pixel circuit of a CMOS image sensor including four transistors. This pixel circuit 10 includes, for example, a photodiode 51 as a photoelectric converting element. Further, four transistors of a transfer transistor 52, an amplifying transistor 53, a selecting transistor 54 and a reset transistor 55 are provided as active elements for this one photodiode 51.

The photodiode 51 photoelectrically converts incident light into the electrical charge (here, electron) having the amount matching the light amount. The transfer transistor 52 is connected between the photodiode 51 and floating diffusion FD, and a driving signal is given to the gate of the transfer transistor 52 (transfer gate) through the transfer control line LTx to transfer the electron photoelectrically converted by the photodiode 51 to the floating diffusion FD.

The floating diffusion FD is connected with the gate of the amplifying transistor 53. The amplifying transistor 53 is connected to the signal line LSGN through the selecting transistor 54, and forms a source follower together with the constant current source 56 outside the pixel unit.

Further, an address signal is given to the gate of the selecting transistor 54 through the selecting control line LSEL, and, when the selecting transistor 54 is turned on, the amplifying transistor 53 amplifies the potential of the floating diffusion FD and outputs the voltage matching the potential to the output (vertical) signal line LSGN. The signal voltage output from each pixel through the signal line LSGN is output to a pixel signal reading circuit.

The reset transistor 55 is connected between a power source line LVDD and floating diffusion FD. When a reset signal is given to the gate of the reset transistor 55 through the reset control line LRST, the reset transistor 55 resets the potential of the floating diffusion FD to the potential of the power source line LVDD. More specifically, when pixels are reset, the transfer transistor 52 is turned on, the electrical charge accumulated in the photodiode 51 is flushed, the transfer transistor 52 is then turned off, and the photodiode 51 converts and accumulates an optical signal into the electrical charge.

Upon reading, the reset transistor 55 is turned on, the floating diffusion FD is reset, the reset transistor 55 is turned off, and the voltage of the floating diffusion FD at this time is output through the amplifying transistor 53 and selecting transistor 54. The output at this time is a P phase output.

Next, the transfer transistor 52 is turned on, the electrical charge accumulated in the photodiode 51 is transferred to the floating diffusion FD and the voltage of the floating diffusion FD at this time is output from the amplifying transistor 53. The output at this time is a D phase output. The CDS/AD circuit unit 23 uses the difference between the D phase output and P phase output as an image signal, thereby canceling from the image signal not only variation of the DC component of the output of each pixel but also FD reset noise of the floating diffusion.

For example, the gates of the transfer transistor 52, selecting transistor 54 and reset transistor 55 are connected in units of rows, and therefore these operations are performed at the same time with respect to each pixel in one row.

Further, one of the most advanced modes of a pixel signal reading (outputting) circuit of the column parallel output CMOS image sensor is a type which has an analog digital converter (hereinafter, "ADC") per column and retrieves a pixel signal as a digital signal. The CMOS image sensor on which this column parallel ADC is mounted is disclosed in, for example, above Japanese Patent Application Laid-Open No. 2005-278135 or W. Yang et al.

Figure 3:
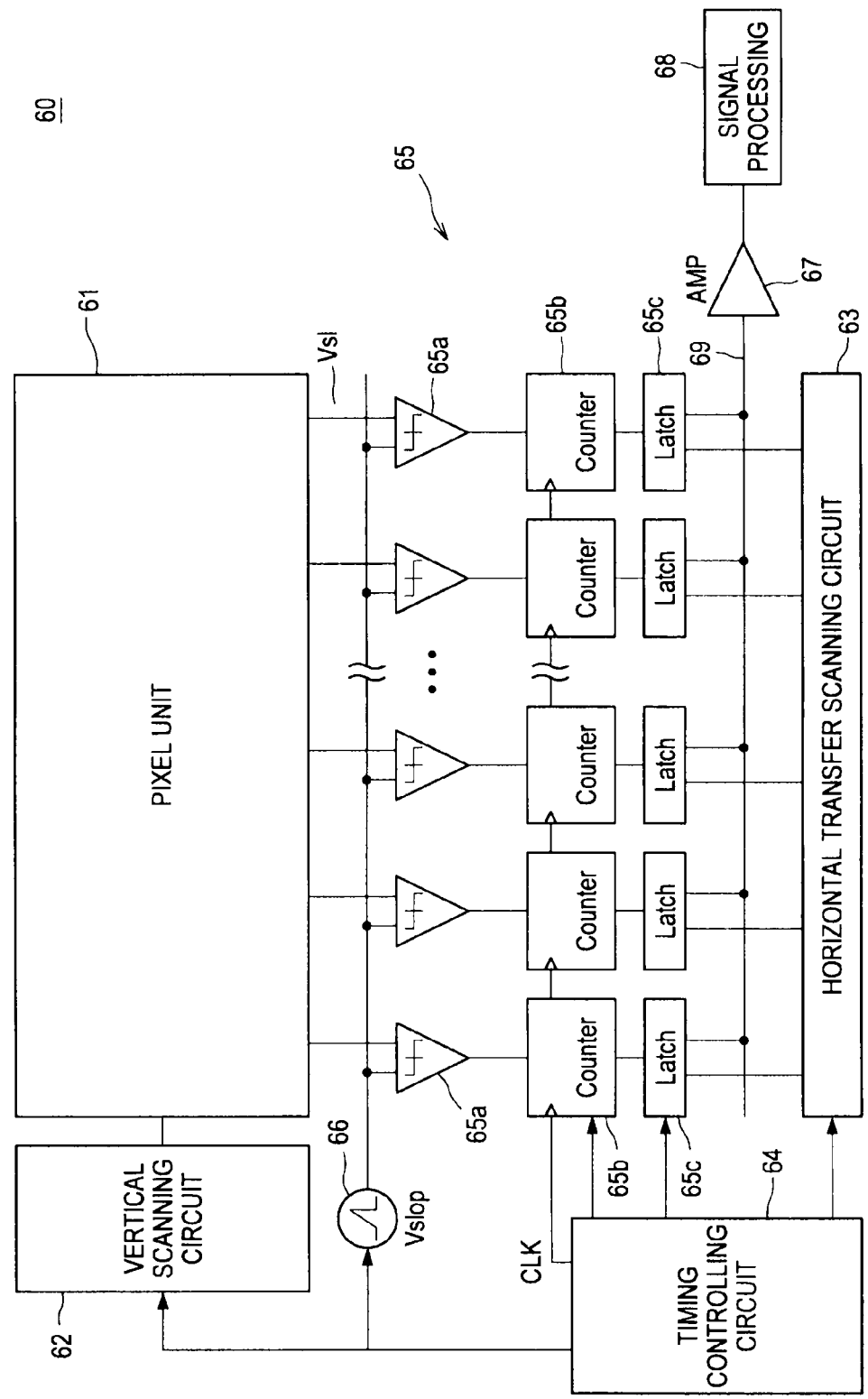
FIG. 3 is a block diagram showing a configuration example of a solid state image capturing element (CMOS image sensor) on which a column parallel ADC is mounted.

FIG. 3 is a block diagram showing a configuration example of a solid state image capturing element (CMOS image sensor (CMOS-IS)) on which the column parallel ADC is mounted. A solid state image capturing element 60 shown in FIG. 3 corresponds to the image capturing element 21 and CDS/AD circuit unit 23 in FIG. 1, the pixel unit 61 corresponds to the image capturing element 21 in FIG. 1 and the circuit portion in the stage subsequent to the ADC group 25 corresponds to the CDS/AD circuit unit 23. Further, each pixel circuit of the pixel unit 61 corresponds to the circuit in FIG. 2. As shown in FIG. 3, the solid state image capturing element 60 has a pixel unit 61 of an image capturing unit, a vertical scanning circuit 62, a horizontal transfer scanning circuit 63, a timing controlling circuit 64, the ADC group 25, a digital analog converter (hereinafter "DAC") 66, an amplifier circuit (S/A) 67 and a signal processing circuit 68.

The pixel unit 61 includes the photodiode 51 and an intra-pixel amplifier, and, for example, the pixels explained in FIG. 2 are configured in a matrix arrangement. Further, in the solid state image capturing element 20, as a controlling circuit which sequentially reads signals of the pixel unit 21, the timing controlling circuit 64 which generates an internal clock, the vertical scanning circuit 62 which controls a row address or row scan and the horizontal transfer scanning circuit 63 which controls a column address and column scan are arranged.

The ADC group 25 is formed by aligning a plurality of columns of ADCs formed with a comparator 65a, a counter 65b and a latch 65c. The comparator 65a compares a reference voltage Vslop of a ramp waveform obtained by changing a reference voltage generated by the DAC 66 stepwise, and an analog signal Vsl obtained from the pixel per row line through the vertical signal line. The counter 65b counts this comparison time. The latch 65c holds the count result.

The ADC group 25 has an n bit digital signal converting function, and is arranged per vertical signal line (column line) to form a column parallel ADC block. The output of each latch 65c is connected with, for example, the horizontal transfer line 69 of the 2n bit width. Further, 2n amplifier circuits 67 corresponding to the horizontal transfer line 69 and signal processing circuit 68 are arranged.

Figure 4:
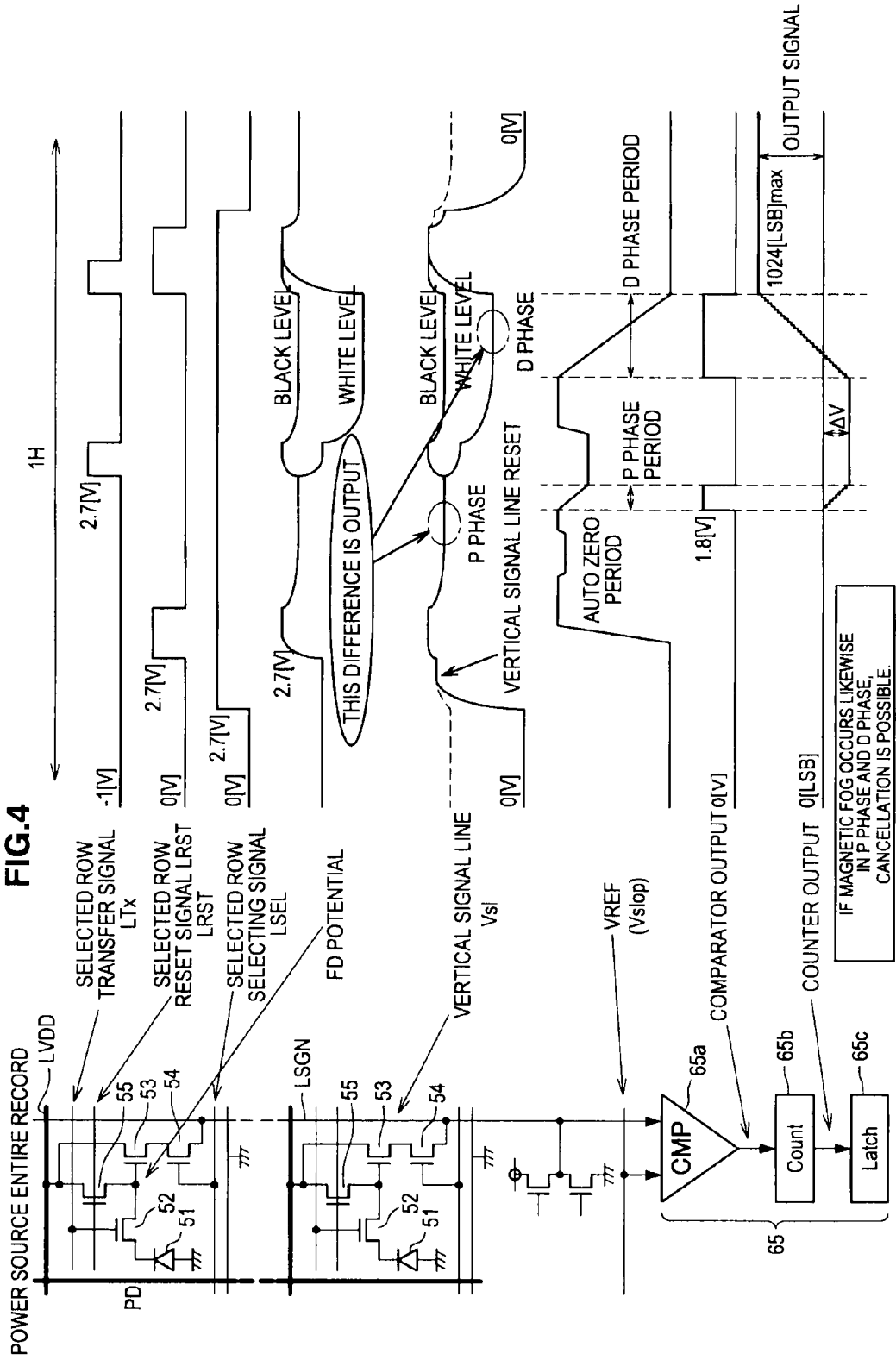
FIG. 4 is a schematic view showing circuits shown in FIGS. 2 and 3, and output waveforms.

FIG. 4 is a schematic view showing the circuits shown in FIGS. 2 and 3, and output waveforms. In the ADC group 65, the analog signal (voltage Vsl) read by the vertical signal line is compared with the reference voltage Vslop in the comparator 65a arranged per column. As shown in FIG. 4, the reference voltage Vslop is formed with a slope waveform (ramp waveform) which has a certain inclination and linearly changes. At this time, the counter 65b arranged per column similar to the comparator 65a is operating, and the potential Vslop having the ramp waveform and a counter value change maintaining a one-to-one correspondence, and the counter 65b converts the potential (analog signal) Vsl of the vertical signal line into a digital signal.

The change of the reference voltage Vslop converts the change of the voltage into the change of time, and converts the change of time into a digital value by counting this time at a certain period (clock). Further, when the analog electrical signal Vsl and reference voltage Vslop cross, the output of the comparator 65a is reversed and an input clock of the counter 65b is stopped, thereby finishing AD conversion. As shown in FIG. 4, when the analog electrical signal Vsl and reference voltage Vslop cross (become equal) in the P phase period, the output of the comparator 65a is reversed from an "H" level to an "L" level. Further, when the polarity of this comparator 65a is reversed, the counter 65b stops the counting operation and the latch 65c holds the count value corresponding to the P phase output ($\Delta V$). Next, when the analog electrical signal Vsl and reference voltage Vslop cross in the D phase period, the output of the comparator 65a is reversed from the "H" level to the "L" level. Further, when the polarity of this comparator 65a is reversed, the counter 65b stops the counting operation and the latch 65c holds the count value corresponding to the output voltage shown in FIG. 4. As shown in FIG. 4, this output voltage is a value obtained by subtracting the P phase output ($\Delta V$) from the D phase output when the comparator 65a reverses the polarity in the D phase period. By this means, it is possible to obtain the output voltage which is the difference between the D phase output and P phase output.

After the above AD conversion period ends, the horizontal transfer scanning circuit 63 inputs data (output voltage) held in the latch 65c, to the signal processing circuit 68 through the horizontal transfer line 69 and amplifier circuit 67 to generate a two-dimensional image. In this way, column parallel output processing is performed.

[3. Occurrence of Magnetic Fog]

However, the magnetism produced by the driving unit such as the actuator 113b of the correcting lens unit 113 or the actuator which drives the lenses 111 and 112 may be contained in, for example, the output signal line shown in FIG. 2 as noise. The column parallel ADC-mounted solid state image capturing element performs AD conversion for one line in the horizontal direction, and, if this noise is added, noise influences all signals in one line in the horizontal direction. At this time, horizontal stripe noise appears in images, and therefore the noise influence becomes visually distinctive, thereby deteriorating image quality.

More specifically, in a system of a digital camera or a digital still camera, when some driving device is subjected to PWM driving, the magnetic flux produced from the coil of the driving device penetrates the signal line of the pixel electrical charge information. By this means, the magnetism is produced by electromagnetic induction within the signal line and, as a result, the signal line of pixel electrical charge information contains noise.

As described above, the CDS/AD circuit unit 23 outputs for image data the difference between the D phase output and P phase output as an image signal. Therefore, in the present embodiment, noise of the same level is contained in the P phase output and D phase output, so that the noise influence is cancelled from the image signal and occurrence of horizontal stripe noise is suppressed. In the present embodiment, by adjusting the PWM driving frequency of the lenses such that noise is contained likewise in the P phase and D phase, the CDS/AD circuit unit 23 cancels these noises.

[4. Method of Avoiding Magnetic Fog Phenomenon in Static Image Capturing Mode]

A case will be explained as one example where a magnetic fog phenomenon will be avoided in still image capturing mode of a digital still camera or digital video camera in which the image capturing element 21 is a CMOS image sensor and a vibration proof lens which is subjected to PWM driving is mounted as the correcting lens unit 113.

As described above, the magnetic fog phenomenon occurs because noise is contained in the output signal line in the pixels of the image capturing element 21 while electrical charge information is read. In the present embodiment, to avoid the occurrence of a magnetic fog, noise is prevented from being contained in the signal line in which electrical charge information of pixels passes only while signals pass through the output signal line of the pixels of the image capturing element 21.

[4-1. First Method of Avoiding Magnetic Fog Phenomenon]

Two examples will be explained below as specific methods of preventing noise from occurring. An example will be explained as the first example where driving of the driving device is stopped which is the source of a magnetic fog while electrical charge information of pixels of the image capturing element 21 passes the signal line. Here, the actuator 113b of the correcting lens unit 113 is the source which causes a magnetic fog. In this case, while electrical charge information of pixels of the image capturing element 21 passes the signal line, the actuator 113b is stopped and the magnetic flux produced from the coil of the actuator 113b of the driving device is removed to prevent noise from being contained in the signal line in which the electrical charge information of the pixels passes.

Figure 5:
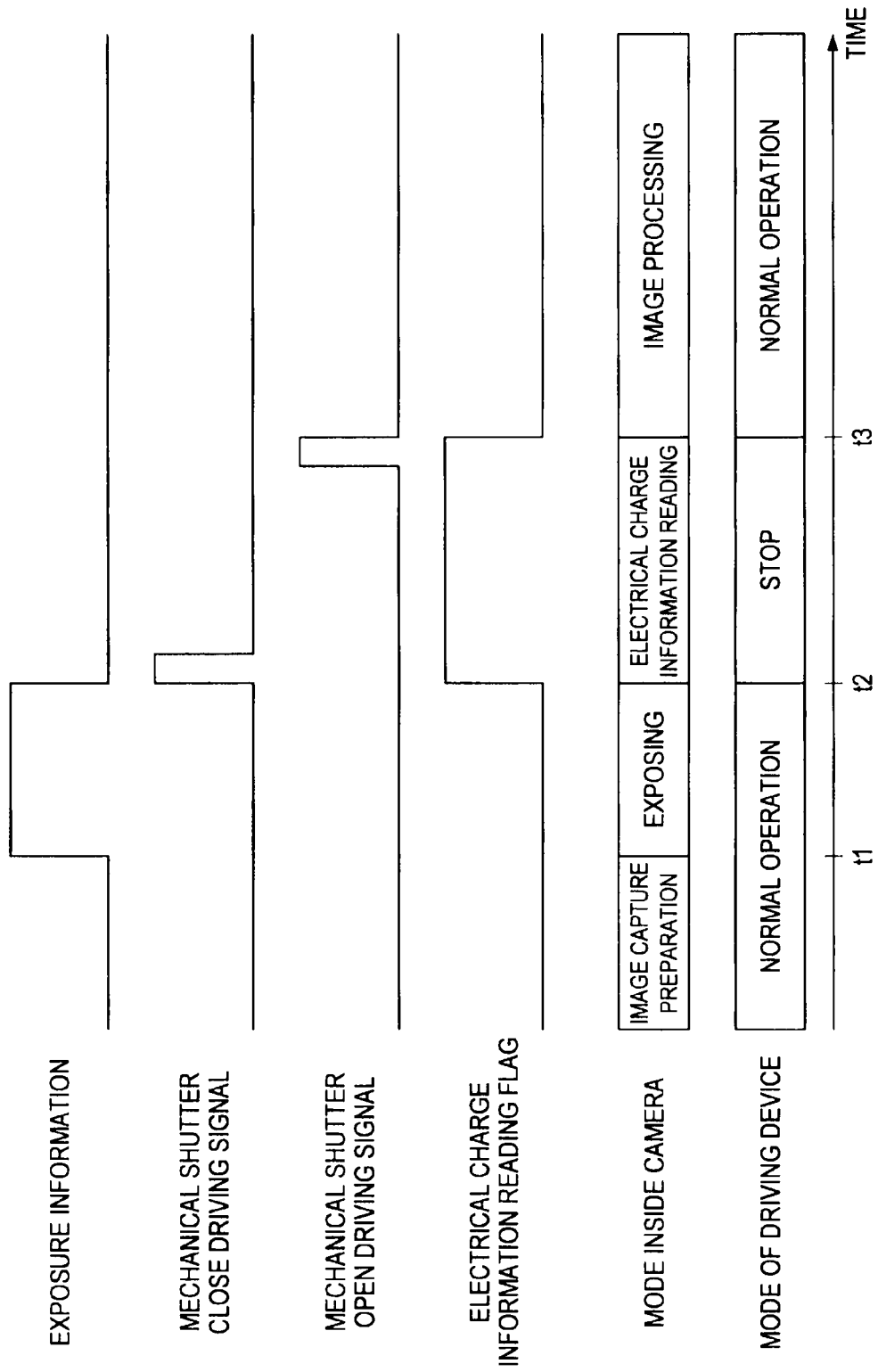
FIG. 5 is a timing chart showing a timing of each signal including an electrical charge information reading flag.

Therefore, a flag is generated which indicates a timing when electrical charge information of pixels of the image capturing element 21 passes the signal line (more specifically, output signal destination LSGN), particularly, a timing when the signal processing unit 24 is reading the electrical charge information of the pixels of the image capturing element 21. Hereinafter, this flag will be referred to as "electrical charge information reading flag" of the image capturing element. FIG. 5 is a timing chart showing the timing of each signal including an electrical charge information reading flag.

The electrical charge information reading flag can be generated based on the control signal related to reading of the electrical charge information in the controlling unit 50. As described above, when the electrical charge is read, the reset transistor 55 is turned on, the floating diffusion FD is reset, the reset transistor 55 is turned off and then the voltage of the floating diffusion FD is output through the amplifying transistor 53 and the P phase output is output through the selecting transistor 54. Next, the transfer transistor 52 is turned on, the electrical charge accumulated in the photodiode 51 is transferred to the floating diffusion FD and then the voltage of the floating diffusion FD is output as the D phase output from the amplifying transistor 53. Accordingly, the controlling unit 50 can generate an electrical charge information reading flag based on each control signal for controlling the image capturing element 21 through the timing controlling circuit 22.

As shown in FIG. 5, at time t1, exposure in the image capturing surface of the image capturing element 21 is started and is continued until time t2. Then, the electrical charge is read from the image capturing element 21 in the interval (time t2 to t3) in which the electrical charge information reading flag is high.

Further, camera mode is "image capture preparation" before time t1, "exposing" between time t1 to t2, "electrical charge information reading" between time t2 to t3 and "image processing" after time t3.

Further, as shown in FIG. 5, with a driving device (actuator 113b) mode, the actuator 113b is stopped in the interval (between time t2 to t3) in which the electrical charge information reading flag is high. By this means, the magnetism is not produced from the actuator 113b while electrical charge information is read, so that it is possible to reliably suppress the noise influence due to a magnetic fog.

Further, the electrical charge information reading flag can also be generated based on the driving signal of the mechanical shutter 114. For example, the controlling unit 50 generates an electrical charge information reading flag using an exposure state signal, mechanical shutter CLOSE driving signal and mechanical shutter OPEN driving signal. The exposure state signal is exposure information shown in FIG. 5, and information acquired by the controlling unit 50 through the timing controlling circuit 22 and used to identify whether or not the image capturing element 21 is performing exposure. Further, the mechanical shutter CLOSE driving signal is a signal for commanding to close the mechanical shutter 114 through the mechanical shutter driver 14 immediately before exposure is finished. The mechanical shutter OPEN driving signal is a driving signal for opening the mechanical shutter 114 through the mechanical shutter driver 14 immediately after pixel information of the image capturing element is read by the signal processing unit 24. The mechanical shutter CLOSE driving signal and mechanical shutter OPEN driving signal are generated by the controlling unit 50 and sent to the mechanical shutter driver 14. The mechanical shutter driver 14 drives the mechanical shutter 114 based on the mechanical shutter CLOSE driving signal and mechanical shutter OPEN driving signal.

The exposure state signal indicates that exposure is being performed in the high period and indicates that exposure is not performed in the low period. Further, the mechanical shutter CLOSE driving signal is a signal for commanding to close the mechanical shutter 114 in the high period and for commanding not to close the shutter in the low period. The mechanical shutter 114 starts being closed at the timing when the mechanical shutter CLOSE driving signal rises, and is closed at the timing when the mechanical shutter CLOSE driving signal falls. Further, the mechanical shutter 114 starts being opened at the timing when the mechanical shutter OPEN driving signal rises, and is opened at the timing when the mechanical shutter OPEN driving signal falls.

By using three types of these signals, it is possible to decide the reading start timing and reading end timing for the electrical charge of pixels of the image capturing element 21. Further, it is possible to decide that the period between the electrical charge reading start timing and reading end timing is the timing when the electrical charge of the image capturing element 21 passes the signal line.

First, the timing (electrical charge reading start timing) when electrical charge information of pixels passes the signal line will be explained. The controlling unit 50 decides whether or not the image capturing element 21 is performing exposure. Further, when the image capturing element 21 is performing exposure and the mechanical shutter CLOSE driving signal transitions from high to low, it is decided that the mechanical shutter 114 is completely closed. According to normal control, pixel information accumulated in the pixels of the image capturing element 21 is transferred to the image processing block (signal processing unit 24) from the timing when the mechanical shutter 114 is completely closed. That is, from this timing, electrical charge information of pixels starts passing the vertical signal line. At this time, as shown in FIG. 5, the controlling unit 50 sets the electrical charge information reading flag of the image capturing element 21 to high. When the condition of the mechanical shutter CLOSE driving signal is other than the above, the electrical charge information reading flag of the image capturing element 21 is not particularly controlled.

Next, the timing when electrical charge information of pixels finishes passing the signal line will be explained. According to normal control, the timing when electrical charge information of pixels finishes passing the signal line is the timing when the mechanical shutter OPEN driving signal for opening the mechanical shutter 114 changes from high to low. Hence, by detecting the timing when the mechanical shutter OPEN driving signal for opening the mechanical shutter changes from high to low, it is possible to decide the timing when electrical charge information of pixels finishes passing the vertical signal line. At this time, the controlling unit 50 sets the electrical charge information reading flag of the image capturing element 21 to low.

When the condition of the mechanical shutter OPEN driving signal is other than the above, the electrical charge information reading flag of the image capturing element 21 is not controlled at all. In this way, it is possible to generate the electrical charge information reading flag. Further, only when the electrical charge information reading flag of the image capturing element 21 is high, it is possible to suppress the influence of the magnetic fog phenomenon by cutting the power source for driving the actuator 113b through the driver 12 and stopping driving the actuator 113b.

Figure 6:
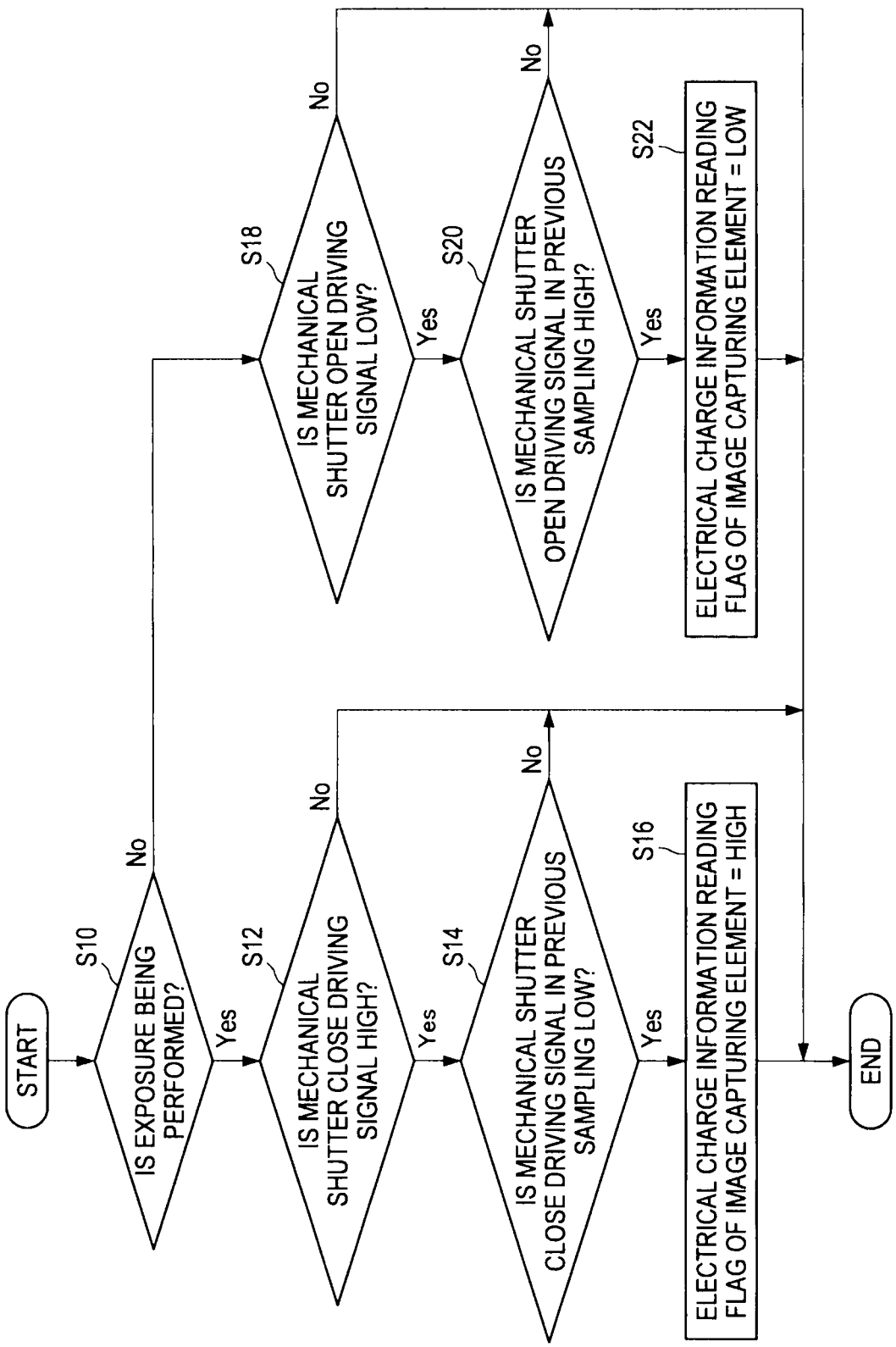
FIG. 6 is a flowchart for deciding whether or not electrical charge information of an image capturing element is being read, according to whether a mechanical shutter is opened or closed.

FIG. 6 is a flowchart of deciding whether or not electrical charge information of the image capturing element 21 is being read according to whether or not the mechanical shutter 114 is opened or closed. First, in step S10, whether or not exposure is being performed is decided based on exposure information of FIG. 5, and, when exposure is being performed, the step proceeds to step S12. In step S12, whether or not the mechanical shutter CLOSE driving signal is high is decided, and, when the mechanical shutter CLOSE driving signal is high, the step proceeds to step S14.

In step S14, whether or not the mechanical shutter CLOSE driving signal is low in previous sampling is decided, and, when the mechanical shutter CLOSE driving signal is low, the step proceeds to step S16. When the step proceeds to step S16, it is possible to decide that the mechanical shutter 114 is closed between previous sampling and current sampling, so that the electrical charge information reading flag of the image capturing element 21 is set to high. After step S16, processing is finished.

Further, when the mechanical shutter CLOSE driving signal is not high in step S12, processing ends. Further, in step S14, when the mechanical shutter CLOSE driving signal is not low in previous sampling, processing ends.

In step S10, when exposure is not being performed, the step proceeds to step S18. In step S18, whether or not the mechanical shutter OPEN driving signal is low is decided, and, when the mechanical shutter OPEN driving signal is low, the step proceeds to step S20. In step S20, whether or not the mechanical shutter OPEN driving signal is high in previous sampling is decided, and, when the mechanical shutter OPEN driving signal is high, the step proceeds to step S22. When the step proceeds to step S22, it is possible to decide that the mechanical shutter 114 is opened between previous sampling and current sampling, so that the electrical charge information reading flag of the image capturing element 21 is set to low. After step S22, processing ends.

Further, when the mechanical shutter OPEN driving signal is not high in step S18, processing ends. Further, in step S20, when the mechanical shutter OPEN driving signal is not low in previous sampling, processing ends.

In addition, although the actuator 113b of the driving device which drives the vibration proof lens for image stabilization has been explained as an example in the present embodiment, even other driving devices are also applicable in the same manner. Further, the timing to stop the driving device is only one example, and is by no means limited to this.

[4-2. Second Method of Avoiding Magnetic Fog Phenomenon]

Next, the second method of avoiding the magnetic fog phenomenon will be explained. The second method is directed to switching the driving frequency of the driving device (actuator 113b) which performs PWM driving, to the driving frequency which reduces noise while the signal processing unit 24 reads electrical charge information of pixels of the image capturing element 21. Even the second method where the driving frequency is switched by the driver 12 will be explained using the actuator 113b of the driving device which drives the vibration proof lens as an example.

Figure 7:
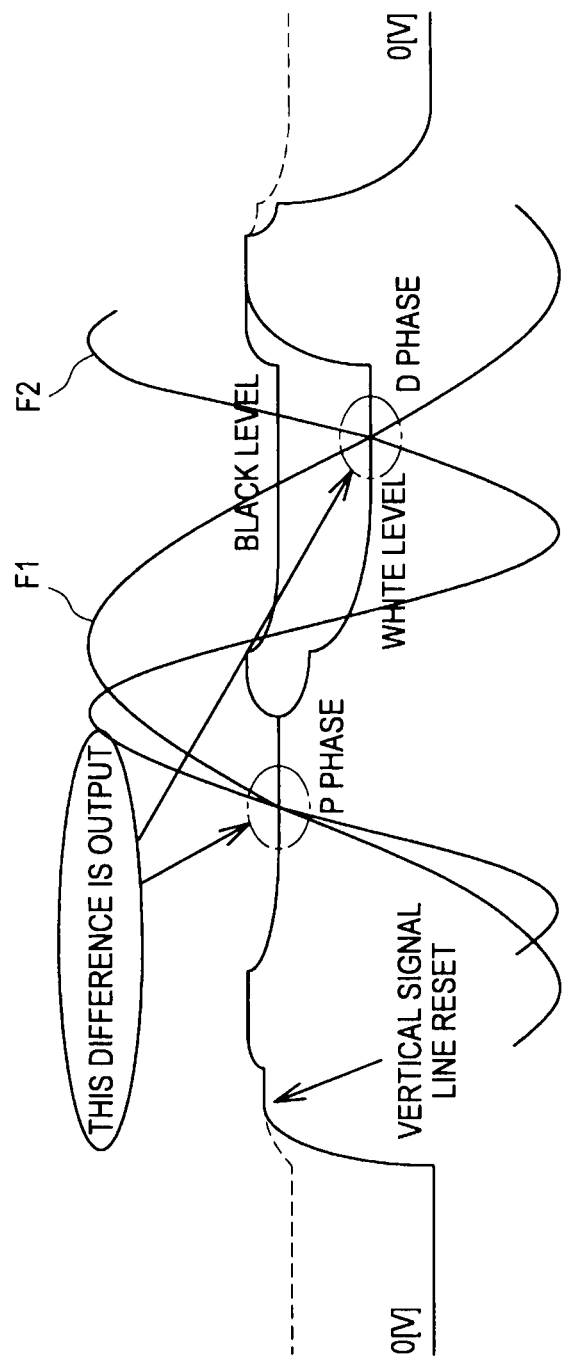
FIG. 7 is a schematic view for explaining the principle of a second method.

FIG. 7 is a schematic view for explaining the principle of the second method. The waveform shown in FIG. 7 indicates the analog signal Vsl obtained from the vertical signal line, and is the same as the potential Vsl shown in FIG. 4. As described above, the difference between the P phase output and D phase output is the output of the CDS/AD circuit unit 23. The two waveforms F1 and F2 shown in FIG. 7 indicate noise produced by driving of the actuator 113b, and the waveform F1 indicates that the frequency of the actuator 113b is f1 [Hz] and the waveform F2 indicates that the frequency is 2f [Hz].

When the frequency of the actuator 113b is f1 [Hz], the timing of the P phase output corresponds to the noise rising timing, and the timing of the D phase output corresponds to the noise falling timing. In this case, the noise influence upon the P phase output and D phase output becomes the reverse phase, and therefore the difference between the P phase output and D phase output contains a significant noise influence.

By contrast with this, when the frequency of the actuator 113b is 2f [Hz], the timing of the P phase output corresponds to the noise rising timing, and the timing of the D phase output also corresponds to the noise rising timing. In this case, the noise influence upon the P phase output and D phase output becomes the in-phase, and therefore it is possible to cancel the noise influence by taking the difference between the P phase output and D phase output.

Thus, in the second example, as one example, by driving the actuator 113b at the frequency f [Hz] at the normal time and driving the actuator 113b at the frequency 2f [Hz] while the electrical charge is read, it is possible to cancel the noise influence.

Figure 8:
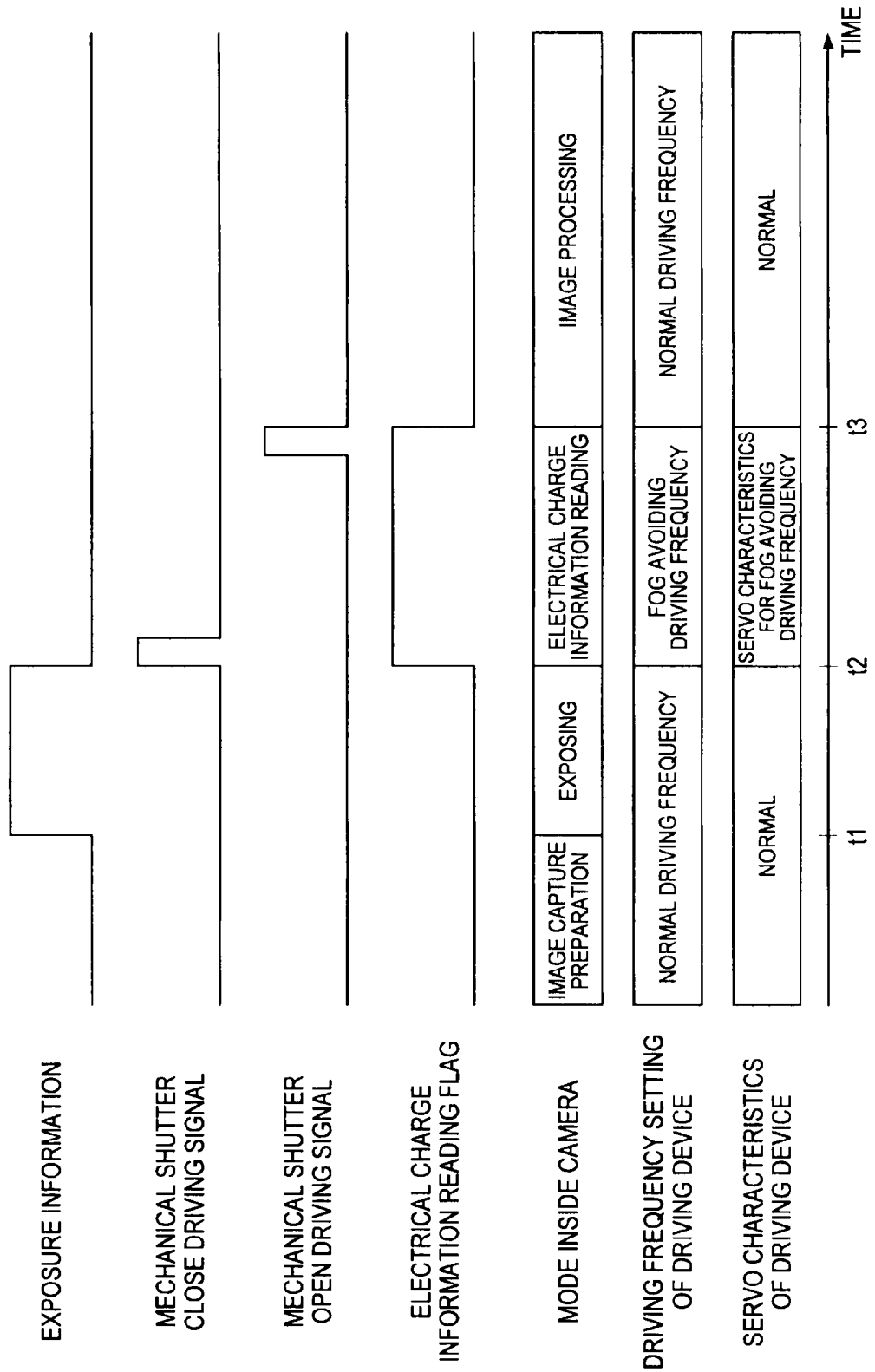
FIG. 8 is a view showing a timing chart according to a second embodiment.

FIG. 8 shows a timing chart according to the second embodiment. The timing (electrical charge information reading flag) when the signal processing unit 24 reads electrical charge information of pixels of the image capturing element 21 can be generated in the same manner as the first method. In the second example, as shown in FIG. 8, between time t2 and t3 when the electrical charge information reading flag is high, the driving frequency of the driving device (actuator 113b) is set to the frequency which can avoid noise. More specifically, at the timing when electrical charge information of pixels is read, that is, when the electrical charge information reading flag of the image capturing element 21 is high, the controlling unit 50 switches through the driver 12 the PWM driving frequency of the actuator 113b of the correcting lens unit 113 to the driving frequency which reduces noise. As one example, the normal driving frequency in FIG. 8 corresponds to the frequency f in FIG. 7, and the fog avoiding driving frequency corresponds to the frequency 2f in FIG. 7.

Further, when the PWM driving frequency of the driving device is changed, the phase of the driving device and gain frequency characteristics also change. Hence, when only the PWM driving frequency changes, the driving device, for example, oscillates, thereby causing a trouble in the desired operation of the vibration proof lens. Hence, as shown in FIG. 8, between time t2 to t3, when the PWM driving frequency is changed, servo characteristics of the driving device (driving response parameter) is changed at the same time. By this means, the servo characteristics are changed such that the phase of the driving device and gain frequency characteristics in the state where the PWM driving frequency is changed become characteristics before the PWM driving frequency is changed. Consequently, it is possible to prevent the magnetic fog from occurring while preventing the trouble from occurring in the desired operation of the driving device.

More specifically, as servo characteristics, three types of parameters of proportional gain, speed gain, and integration gain are used in PID control. When the driving frequency is changed, the servo response changes, and therefore servo characteristics are changed by changing these gains. By this means, it is possible to reliably prevent the trouble in the operation of the driving device.

Figure 9:
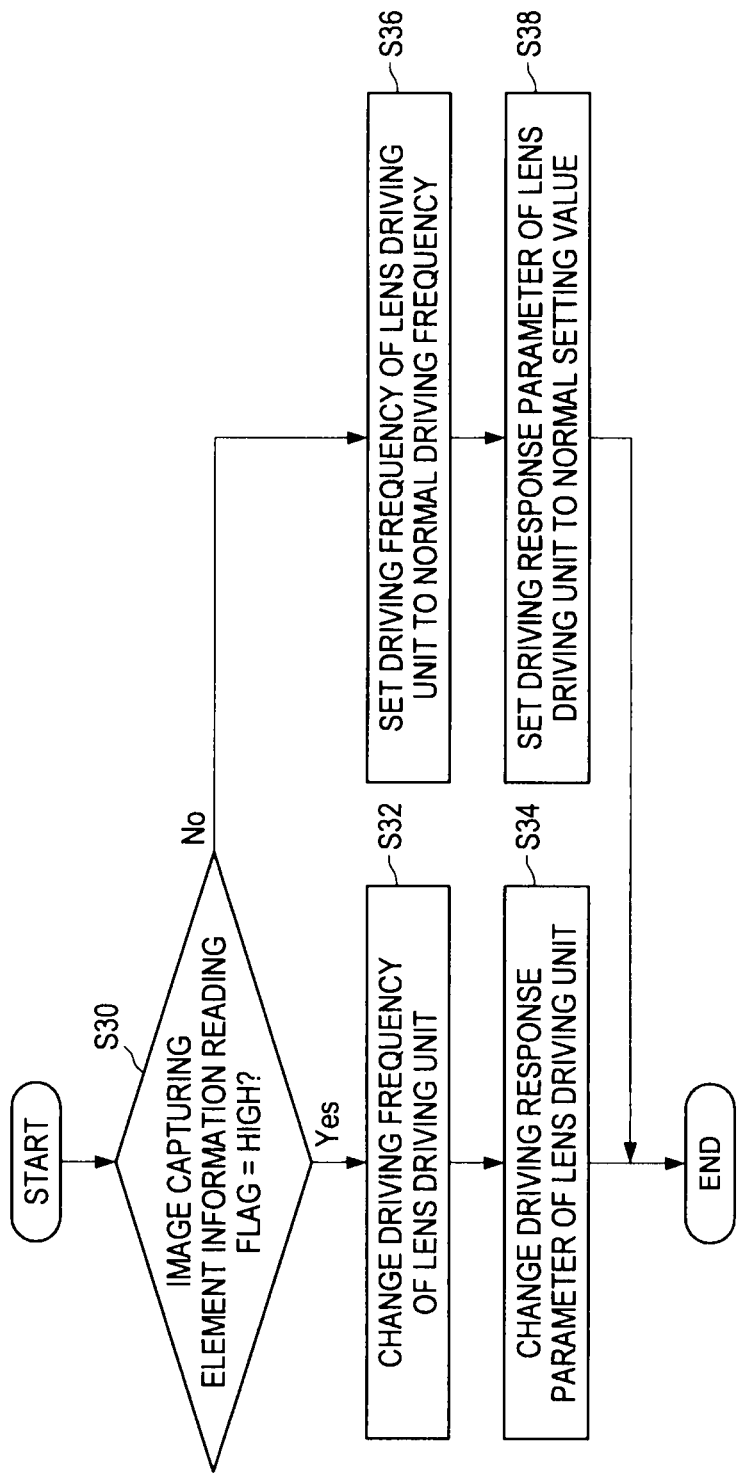
FIG. 9 is a flowchart showing setting algorithms for a driving frequency and a driving response parameter of an actuator when static images are captured.

FIG. 9 is a flowchart showing the setting algorithms for the driving frequency and driving response parameter of the actuator 113b upon still image capturing. First, in step S30, whether or not the electrical charge information reading flag is high is decided, and, when the reading flag is high, the step proceeds to step S32 and the driving frequency of the actuator 113b is changed from the normal driving frequency to the fog avoiding driving frequency. After step S32, the step proceeds to step S34, and the driving response parameter of the lens driving unit is changed. After step S34, processing ends.

In step S30, the step proceeds to step S36 when the reading flag is low. In step S36, the driving frequency of the actuator 113b is set to the normal driving frequency. In next step S38, the driving response parameter of the lens driving unit is set to a normal setting value. After step S38, processing ends.

Next, the setting of the driving frequency will be explained in detail. As one example of a method of determining the driving frequency which reduces noise, by referring to gain frequency characteristics of the output of the CDS circuit of CMOS, the frequency which reduces the gain value of the frequency characteristics of the CDS circuit is selected as the driving frequency of the driving device (here, vibration proof lens).

Figure 10:
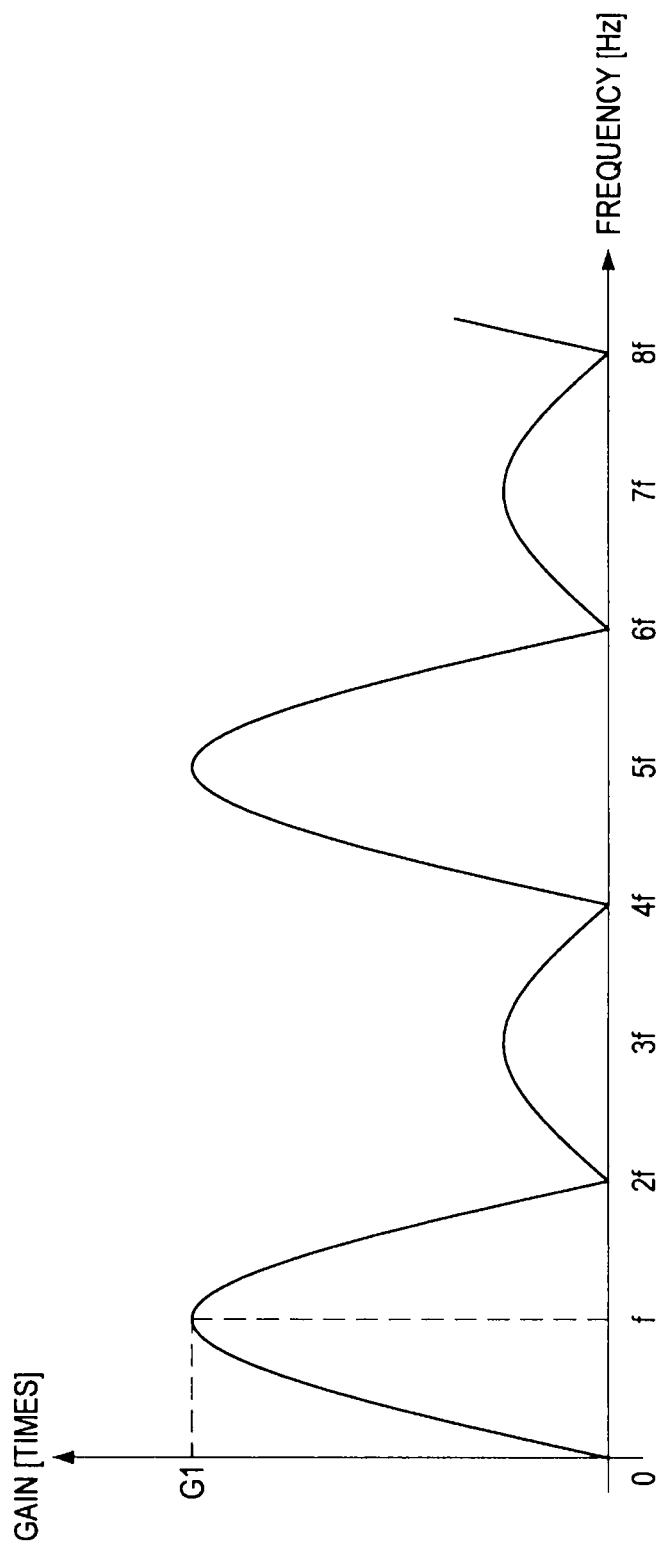
FIG. 10 is a characteristic diagram showing filtering characteristics of a CMOS gain of an image capturing element.

For example, in a system of the digital camera according to the present embodiment, filtering characteristics (frequency characteristics matching noise) of gain of CMOS-IS of the image capturing element 21 are as shown in FIG. 10. In this case, when the normal PWM driving frequency is f [Hz] in cases other than cases where electrical charge information is being read, the gain value of the CDS/AD circuit unit 23 at f [Hz] increases. As a result, when electrical charge information of the image capturing element 21 is read, there is a possibility that the signal line for electrical charge information contains noise due to the influence of the magnetic flux produced from the coil of the driving device.

By contrast with this, when the PWM driving frequency of the lens 113 while electrical charge information is read is 2f [Hz], the gain value of the CDS/AD circuit unit 23 at 2f [Hz] is 0 times. As a result, when electrical charge information of the image capturing element 21 is read, it is possible to reduce the possibility that noise is contained in the signal line of electrical charge information due to the influence of the magnetic flux produced from the coil of the driving device. Consequently, as one example, only while pixel information is read, it is possible to reliably prevent noise from occurring by setting the driving frequency of the driving device to 2f [Hz]. Similarly, by setting the driving frequency of the driving device to 4f [Hz] or 6f [Hz], it is possible to reliably suppress noise. In addition, the frequency f in FIG. 10 corresponds to the frequency f in FIG. 7, and the frequency 2f in FIG. 10 corresponds to the frequency 2f in FIG. 7.

Further, even when noise occurs, if noise does not influence image quality much, the frequency (for example, 3f [Hz] or any frequency between 2f [Hz] to 4f [Hz] in FIG. 10) indicating gain other than 0 times can also be selected as the driving frequency of the actuator 113*b*.

In addition, when addition of pixels used in, for example, the movie mode is performed, although filtering characteristics of CMOS-IS (frequency characteristics matching noise) may become the complicated function, the method which reduces noise by selecting the frequency of small gain does not change.

<5. Method of Avoiding Magnetic Fog Phenomenon in Movie Shooting Mode>

Next, the method of avoiding the magnetic fog phenomenon in the movie shooting mode will be explained. When the image capturing mode is changed, there are cases where the reading mode of the image capturing element 21 is changed. Further, when the reading mode of the image capturing element is changed, gain characteristics of the CDS/AD circuit unit 23 also change. This is because, when the reading mode of the image capturing element 21 changes, the time between the P phase output and D phase output in FIG. 7 changes according to the reading mode. For example, there are cases where, between the movie shooting mode and static image shooting mode, the time between the P phase output and D phase output changes according to the mode, and, between the daytime shooting mode and night time shooting mode, the time between the P phase output and D phase output changes according to the mode.

A case will be explained as an example where gain frequency characteristics of the CDS/AD circuit unit 23 of CMOS in the static image mode correspond to characteristics in FIG. 10, and gain frequency characteristics of the CDS/AD circuit unit 23 of CMOS in the movie mode correspond to characteristics in FIG. 11. Further, a case will be explained where the normal driving frequency of the driving device is f [Hz].

As shown in FIG. 10, when the driving frequency upon still image shooting is f [Hz], gain characteristics in the still image mode are greater than the neighboring frequency. Therefore, as described above, by driving the actuator 113*b* at the frequency of 2f [Hz] only while electrical charge information of the image capturing element 21 is read, it is possible to avoid the noise influence due to the magnetic fog.

Figure 11:
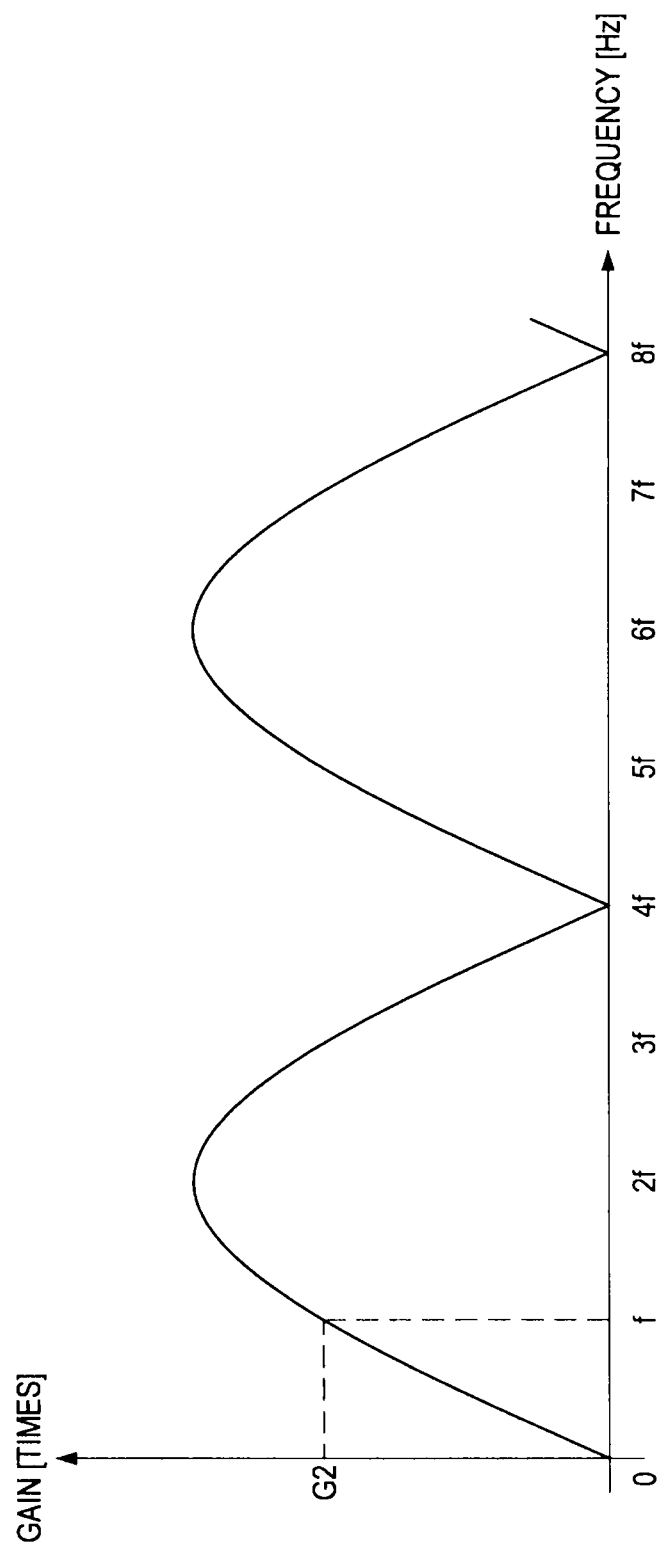
FIG. 11 is a characteristic diagram showing gain frequency characteristics of a CDS/AD circuit unit of CMOS in the movie mode.

Further, when the still image mode is switched to the movie mode in a state where the driving frequency of the actuator 113*b* is f [Hz], gain frequency characteristics of the CDS/AD circuit unit 23 is switched from FIG. 10 to FIG. 11. In this case, when the driving frequency is f [Hz] in the movie mode, although the value of gain G2 in the movie mode is more or less smaller than gain G1 in the still image mode, gain G2 is still a great value and therefore the noise influence is assumed to occur. Particularly, in the movie mode, electrical charges are sequentially read, and therefore it is preferable to change the driving frequency when the mode is switched. Hence, in characteristics of the movie mode shown in FIG. 11, the driving frequency of the actuator 113*b* is changed to the frequency between 0 and f [Hz] where the gain value becomes small or the frequency between 3f [Hz] and 4f [Hz]. More preferably, while electrical charges are read in the movie mode, by setting the driving frequency to 4f, it is possible to reliably suppress the noise influence due to a magnetic fog. By this means, it is possible to reliably reduce the influence of the magnetic fog.

As a specific controlling method, the controlling unit 50 decides whether or not the magnetic fog influences the mode which is currently set and the driving frequency of the actuator 113*b* needs to be changed in this mode. At this time, when driving is performed at the normal frequency f [Hz], whether or not there is the influence of the magnetic fog in each mode and the frequency for suppressing the magnetic fog in each mode may be stored in advance in, for example, the memory 43 provided in the imaging device 100, and the controlling unit 50 may change the frequency based on the stored information. Further, the memory 43 may store characteristics shown in FIGS. 10 and 11. Then, in case of the mode in which the driving frequency of the actuator 113*b* needs to be changed, the driving frequency of the actuator 113*b* is changed. By contrast with this, in case of the mode in which the driving frequency of the actuator 113*b* need not be changed, the driving frequency is not changed. By this means, even when the image capturing mode changes and therefore the reading mode of the image capturing element is changed, it is possible to avoid the magnetic fog. In addition, the mode is by no means limited to the still image mode and movie mode, and is applicable to various modes (night time shooting mode and face detection mode) set in the imaging device 100.

Figure 12:
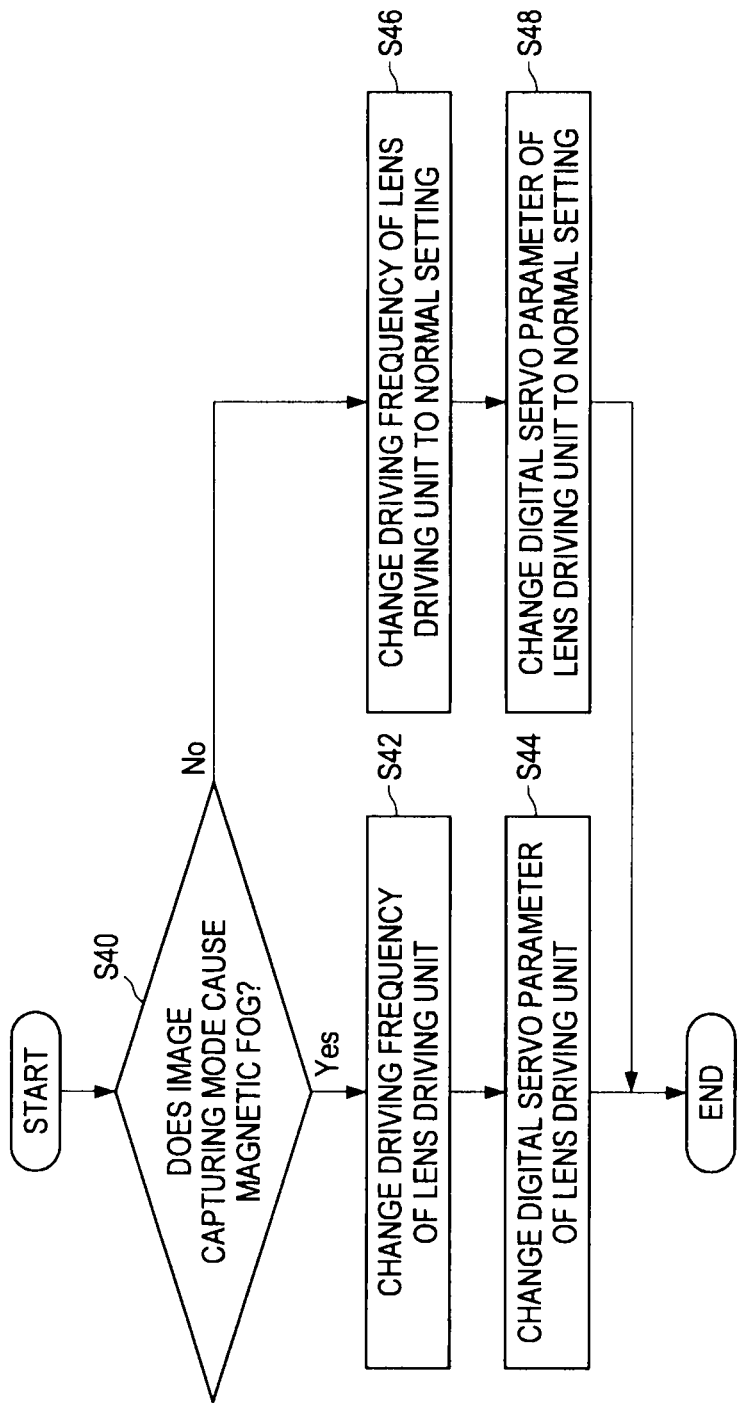
FIG. 12 is a flowchart showing processing of changing a driving frequency and driving response parameter of a lens driving unit according to a mode.

FIG. 12 is a flowchart showing processing of changing the driving frequency and driving response parameter of the lens driving unit according to the mode. First, in step S40, whether or not a magnetic fog occurs in this mode is decided, and, in case of the mode which causes a magnetic fog, the step proceeds to step S42. In step S42, the frequency of the lens driving unit is changed. In next step S44, the driving response parameter (digital servo parameter) of the lens driving unit is changed. After step S44, processing ends.

Further, when it is decided in step S40 that a magnetic fog does not occur in the mode, the step proceeds to step S46. In step S46, the driving frequency of the lens driving unit is changed to the setting upon the normal time. In next step S48, the digital servo parameter of the lens driving unit is changed to the normal setting. After step S48, processing ends.

Figure 13:
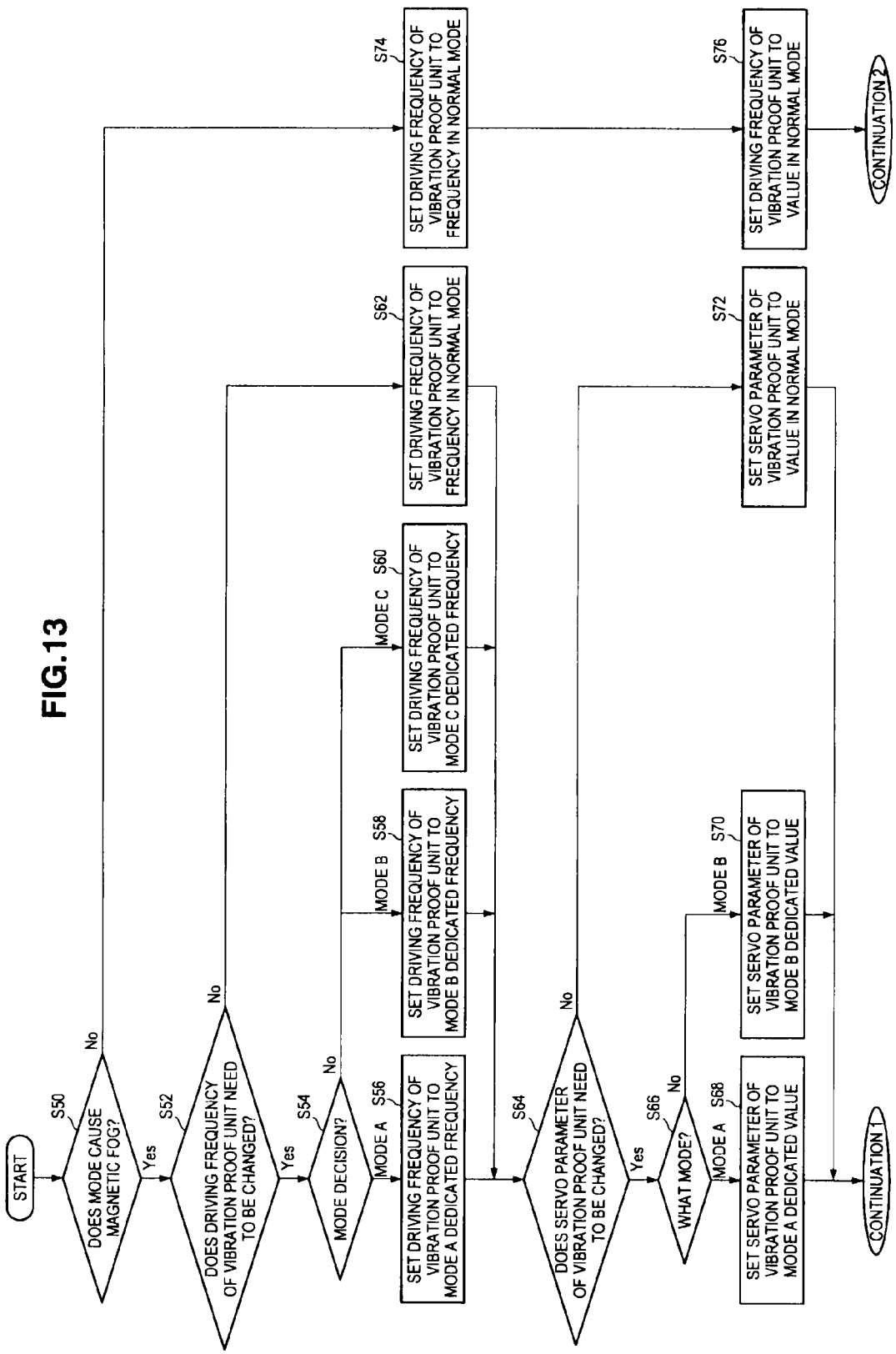
FIG. 13 is a flowchart showing in detail control of changing a frequency and frequency characteristics (servo parameter) when a mode is switched.
Figure 14:
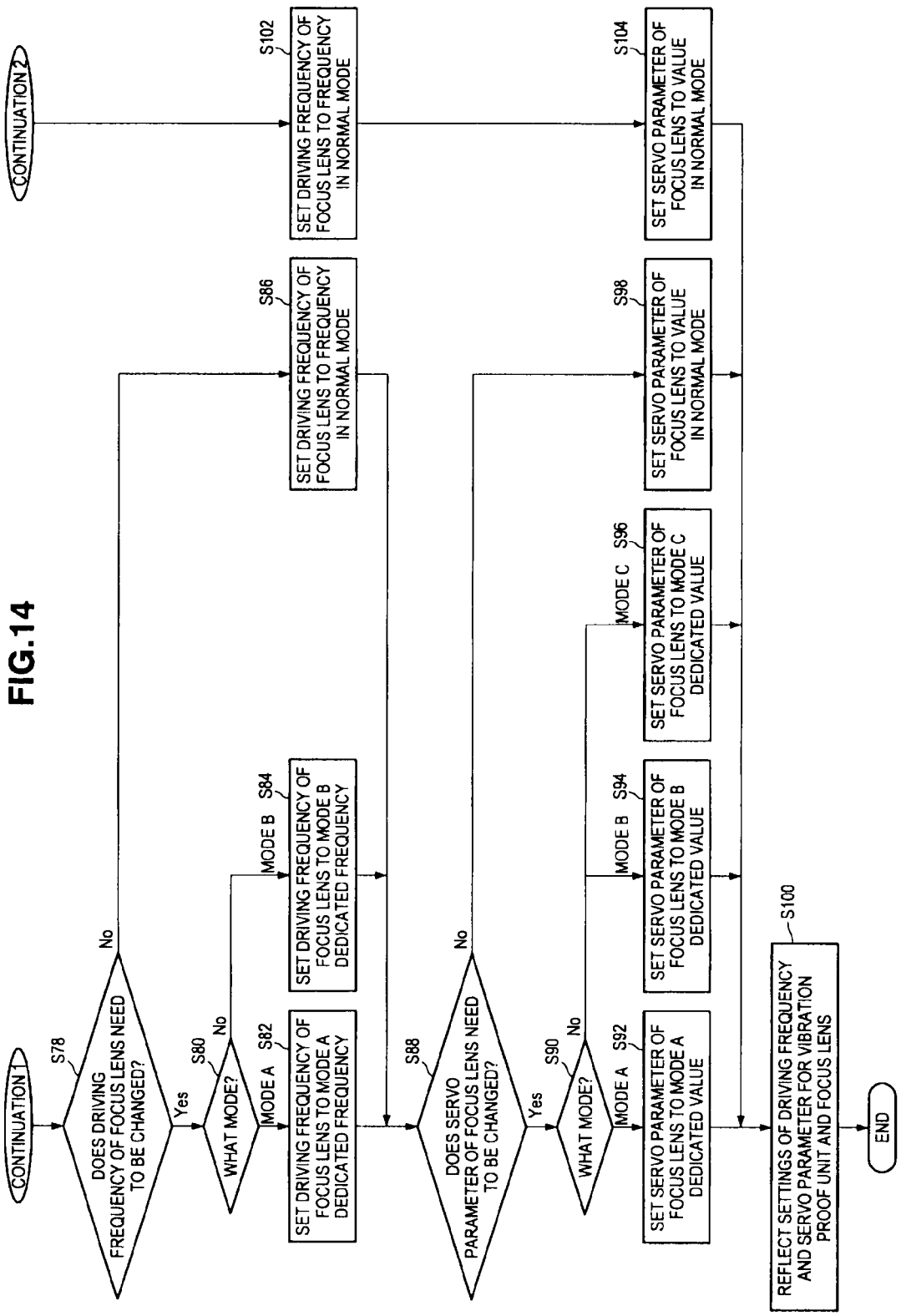
FIG. 14 is a flowchart showing in detail control of changing a frequency and frequency characteristics (servo parameter) when a mode is switched.

FIGS. 13 and 14 are flowcharts showing in detail frequency control when the mode is switched. With the examples of FIGS. 13 and 14, processing is shown which changes respective driving frequencies and settings of driving servo parameters of the driving device for the correcting lens unit 113 and focus lens 112 having the vibration proof function such that the magnetic fog does not occur. Thus, by changing the setting of various driving devices provided in the imaging device 100, it is possible to reliably suppress fuzziness in images due to the magnetic fog.

With the examples shown in FIGS. 13 and 14, there are three modes of A, B and C which are likely to cause the magnetic fog. Further, the modes in which the driving frequency of the vibration proof unit (correcting lens unit 113) needs to be changed are mode A, mode B and mode C, and the modes in which the servo parameter of the correcting lens unit 113 needs to be changed are mode A and mode B. Further, the modes in which the driving frequency of the focus lens 112 needs to be changed are mode A and mode B, and the modes in which the servo parameter of the focus lens 112 needs to be changed are mode A, mode B and mode C. These pieces of information can be stored in the memory 43 provided in the imaging device 100 in advance. Further, the value of the driving frequency and servo parameter which need to be changed in each mode can also be stored in the memory 43 in advance.

In addition, FIGS. 13 and 14 show a series of processings, and, after steps S68, S70 and S72 in FIG. 13, the step proceeds to step S78 in FIG. 14. Further, after step S76 in FIG. 13, the step proceeds to step S102 in FIG. 14.

First, the controlling unit 50 decides whether or not the current mode is the mode which causes a magnetic fog from the driving device (step S50). Further, in case of the mode which does not cause the magnetic fog, the respective driving frequencies and servo parameters of the correcting lens unit 113 and focus lens 112 in the normal mode are set (steps S74, S76, S102 and S104). That is, when the current mode is other than mode A, mode B and mode C, processings in steps S74, S76, S102 and S104 are performed.

When the current mode is the mode which causes a magnetic fog due to the driving device, whether or not the driving frequency of the vibration proof unit needs to be changed in this mode is decided (step S52). When the driving frequency of the vibration proof unit is not necessary, the driving frequency of the vibration proof unit is set to the driving frequency in the normal mode (step S62), and, when the driving frequency of the vibration proof unit needs to be changed, it is decided which mode is the current image capturing mode (step S54).

For example, when the current image capturing mode is mode A, the driving frequency of the vibration proof unit is set to the mode A dedicated frequency which does not cause the magnetic fog (step S56). Further, when the current image capturing mode is mode B, the driving frequency of the vibration proof unit is set to the mode B dedicated frequency which does not cause the magnetic fog (step S58). Further, when the current image capturing mode is mode C, the driving frequency of the vibration proof unit is set to the mode C dedicated frequency which does not cause the magnetic fog (step S60).

According to the above processings, in case of modes A, B and C which cause the magnetic fog, the setting related to the driving frequency of the vibration proof unit ends. Next, setting processing of the servo parameter of the vibration proof unit is performed. As described above, when the current mode is the mode which causes a magnetic fog and the setting of the driving frequency of the vibration proof unit ends by the processings in steps S56, S58, S60 and S62, whether or not the servo parameter of the vibration proof unit needs to be changed in this mode is decided in step S64.

As described above, in the examples of FIGS. 13 and 14, the modes in which the servo parameter of the vibration proof unit needs to be changed are mode A and mode B. When the setting of the servo parameter of the vibration proof unit need not be changed, that is, when the current mode is other than modes A and B, the servo parameter of the vibration proof unit is set to the parameter in the normal mode (step S72). By contrast with this, when the servo parameter of the vibration proof unit needs to be changed, it is decided which image capturing mode is the current mode (step S66). Further, when the current mode is mode A, the mode A dedicated servo parameter of the vibration proof unit is set (step S68), and, when the current mode is mode B, the mode B dedicated parameter is set (step S70).

In addition, there is not processing of changing the mode C servo parameter of the vibration proof unit. This is because whether or not the servo parameter of the vibration proof unit needs to be changed is decided in step S64, and, in mode C, the servo parameter of the vibration proof unit does not need to be changed and therefore the normal servo parameter has already been set.

In addition, the servo parameter is changed because, when the driving frequency of the vibration proof unit is changed but the servo parameter is not changed, the frequency characteristics of the vibration proof unit change, and therefore there is a possibility that the vibration proof unit does not follow as commanded by the driver 12 and the vibration proof unit oscillates. Consequently, by changing the servo parameter suitably for the changed driving frequency, it is possible to set optimal frequency characteristics for driving the vibration proof unit, prevent the vibration proof unit from oscillating and control the vibration proof unit to follow the command of the driver 12.

According to the above processings, when magnetic fog occurs, the setting of the driving frequency and setting of the servo parameter for the vibration proof unit are finished. In processing subsequent to steps S68, S70 and S72, the driving frequency and servo parameter are set for the focus lens 112.

First, after steps S68, S70 and S72, the step proceeds to step S78 and, in case of the mode which causes the magnetic fog, whether or not the current mode is the mode in which the driving frequency of the focus lens 112 needs to be changed is decided. When the driving frequency of the focus lens 112 need not be changed in the current mode, the driving frequency of the focus lens is set to the frequency in the normal mode (step S86). As described above, modes in which the driving frequency of the focus lens 112 needs to be changed are mode A and mode B, and therefore in case of the mode other than mode A and mode B, the step proceeds to step S86. By contrast with this, when the driving frequency of the focus lens 112 needs to be changed in the current mode, the current mode is decided (step S80). When the current mode is mode A, the driving frequency of the focus lens 112 is set to the mode A dedicated driving frequency (step S82). When the current mode is mode B, the driving frequency of the focus lens 112 is set to mode B dedicated driving frequency (step S84). In addition, in mode C, the driving frequency of the focus lens 112 need not be changed, and therefore mode C has already been set to the driving frequency in the normal mode.

When the driving frequency of the focus lens 112 is set according to the above processings, the setting of the servo parameter of the focus lens 112 is determined according to processing subsequent to step S88. First, in step S88, whether or not the current mode is the mode in which the servo parameter of the focus lens needs to be changed is decided. When the current mode is the mode in which the servo parameter need not be changed, the servo parameter of the focus lens 112 is set to the servo parameter of the normal mode (step S98). As described above, modes in which the servo parameter of the focus lens 112 needs to be changed are mode A, mode B and mode C, and therefore, in case of the mode other than modes A, B and C, the step proceeds to step S98. In the current mode, when the servo parameter of the focus lens needs to be changed, it is decided which mode is the current mode (step S90), and the servo parameter is changed to the servo parameter matching the mode. When the current mode is mode A, mode B and mode C, the servo parameter of the focus lens 112 is each set to mode A dedicated, mode B dedicated and mode C dedicated servo parameter (steps S92, S94 and S96).

In addition, the reason why the servo parameter of the focus lens 112 is changed is the same as the reason why the servo parameter of the vibration proof unit is changed. When the driving frequency of the focus lens 112 is changed and the servo parameter is not changed, frequency characteristics of the focus lens change, and therefore there is a possibility that the focus lens does not follow as commanded by the driver 12. In this case, there is a possibility that the focus lens 112 oscillates. Consequently, by changing the servo parameter suitably for the changed driving frequency to set the optimal frequency characteristics for driving of the focus lens 112, it is possible to prevent the focus lens 112 from oscillating and have the focus lens 112 follow the command of the driver 12.

Further, in step S100, by performing control of reflecting the setting of the driving frequency and servo parameter for the vibration proof unit and focus lens 112 set as described above, it is possible to prevent the magnetic fog.

In addition, although the driving unit which drives the vibration proof unit (correcting lens unit 113) and focus lens 112 has been explained in the above example, other driving devices are also applicable. Further, although the image capturing mode has been explained as one example of a mode, the present disclosure is by no means limited to this. Even when the driving frequency and servo parameter are changed according to various modes of internal processing of the imaging device 100, it is possible to provide the same effect.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-162547 filed in the Japan Patent Office on Jul. 20, 2010, the entire content of which is hereby incorporated by reference.

What is claimed is:

1. An imaging device comprising:
one or more processors being operable to:
perform an exposure for a subject image and photoelectrically convert the subject image into electrical charge information, wherein the exposure is performed at a first driving frequency, wherein the one or more processors are operable to select the first driving frequency according to gain characteristics of a correlated double sampling (CDS) circuit of an image capturing element of the imaging device; and
change the first driving frequency to a second driving frequency at a timing when the electrical charge information is read, wherein the second driving frequency is twice the first driving frequency.

2. The imaging device according to claim 1, wherein, when a mode related to the image capturing is changed, the one or more processors are operable to change the first driving frequency to a frequency matching the mode.

3. The imaging device according to claim 1, wherein, when the first driving frequency is changed, the one or more processors are operable to change servo characteristic parameter together with the first driving frequency.

4. The imaging device according to claim 1, wherein the one or more processors are operable to acquire a timing to read the electrical charge information based on a driving signal for opening and closing a mechanical shutter of an image capturing optical system of the imaging device.

5. The imaging device according to claim 1, wherein the first driving frequency and the second driving frequency is performed by a correcting lens for image stabilization.

6. A controlling device comprising:
in an imaging device comprising one or more processors, the one or more processors being operable to:
photoelectrically convert a subject image into electrical charge information at a first driving frequency, wherein the one or more processors are operable to select the first driving frequency according to gain characteristics of a correlated double sampling (CDS) circuit of an image capturing element of the imaging device;
acquire a timing to read the electrical charge information;
change a first driving frequency to a second driving frequency at the acquired timing, wherein the second driving frequency is twice the first driving frequency; and
change one or more servo characteristic parameters at the acquired timing when the first driving frequency changes to a second driving frequency.

7. The controlling device according to claim 6, wherein, when a mode related to the image capturing is changed, the one or more processors are operable to change the first driving frequency to a frequency matching the mode.

8. An imaging device controlling method comprising:
in an imaging device:
performing an exposure for a subject image and photoelectrically converting the subject image into electrical charge information at a first driving frequency;
acquiring a timing to read the electrical charge information; and
changing the first driving frequency to a second driving frequency at the acquired timing, wherein the first driving frequency is changed to the second driving frequency according to gain characteristics of a CDS circuit of an image capturing element, and wherein the second driving frequency is twice the first driving frequency.

9. The imaging device controlling method according to claim 8, further comprising, when a mode related to the image capturing is changed, changing the first driving frequency to a frequency matching the mode.

10. The imaging device controlling method according to claim 8, further comprising changing servo characteristic parameters when the first driving frequency is changed to the second driving frequency.

11. The imaging device according to claim 1, wherein a magnetic fog is generated while the electrical charge information is read, wherein the magnetic fog introduces a noise influence in a static image capturing mode output.

12. The imaging device according to claim 11, wherein, the one or more processors are operable to control stopping the first driving frequency during the timing to suppress the noise influence.

13. The imaging device according to claim 1, wherein a gain value of frequency characteristics of the CDS circuit corresponding to the first driving frequency is greater than a predetermined threshold.

14. The imaging device according to claim 1, wherein a gain value of frequency characteristics of the CDS circuit corresponding to the second driving frequency is zero.

15. The imaging device according to claim 1, wherein the second driving frequency is changed to the first driving frequency at a timing after the electrical charge information is read.

16. The imaging device according to claim 1, wherein the one or more processors are operable to prepare for capturing the subject image prior to performing the exposure at the first frequency.

17. The controlling device according to claim 6, wherein the one or more servo characteristic parameters comprise one or more of: a proportional gain, a speed gain, and an integration gain.

18. An imaging device comprising:
one or more processors being operable to:
perform an exposure for a subject image and photoelectrically convert the subject image into electrical charge information, wherein the exposure is performed at a first driving frequency; and
change the first driving frequency to a second driving frequency at a timing when the electrical charge information is read, wherein the second driving frequency is twice the first driving frequency, wherein the exposure at the first driving frequency and the second driving frequency is performed by a correcting lens for image stabilization.

19. An imaging device comprising:
one or more processors being operable to:
perform an exposure for a subject image and photoelectrically convert the subject image into electrical charge information, wherein the exposure is performed at a first driving frequency; and
change the first driving frequency to a second driving frequency at a timing when the electrical charge information is read, wherein the second driving frequency is twice the first driving frequency,
wherein a magnetic fog is generated while the electrical charge information is read, wherein the magnetic fog introduces a noise influence in a static image capturing mode output.

20. An imaging device comprising:
one or more processors being operable to:
perform an exposure for a subject image and photoelectrically convert the subject image into electrical charge information, wherein the exposure is performed at a first driving frequency; and
change the first driving frequency to a second driving frequency at a timing when the electrical charge information is read, wherein the second driving frequency is twice the first driving frequency,
wherein the one or more processors are operable to acquire the timing to read the electrical charge information based on a driving signal for opening and closing a mechanical shutter of an image capturing optical system of the imaging device.

21. An imaging device comprising:
one or more processors being operable to:
perform an exposure for a subject image and photoelectrically convert the subject image into electrical charge information, wherein the exposure is performed at a first driving frequency; and
change the first driving frequency to a second driving frequency at a timing when the electrical charge information is read, wherein the second driving frequency is twice the first driving frequency,
wherein a gain value of frequency characteristics of a correlated double sampling (CDS) circuit corresponding to the first driving frequency is greater than a predetermined threshold.

* * * * *